US006874891B1

(12) United States Patent
Fleming

(10) Patent No.: US 6,874,891 B1
(45) Date of Patent: Apr. 5, 2005

(54) HOLOGRAPHIC DISPLAY SYSTEM

(75) Inventor: John Stuart Fleming, 63 Queenstown Road, Auckland (NZ), 1006

(73) Assignee: John Stuart Fleming, Lubbock, TX (US)

( * ) Notice: Subject to any disclaimer, the term of this patent is extended or adjusted under 35 U.S.C. 154(b) by 269 days.

(21) Appl. No.: 10/216,028

(22) Filed: Aug. 9, 2002

Related U.S. Application Data

(60) Provisional application No. 60/311,450, filed on Aug. 9, 2001.

(51) Int. Cl.[7] .................................................. G03H 1/22
(52) U.S. Cl. ............................. 353/32; 353/33; 353/15; 353/22; 353/47; 362/425
(58) Field of Search ............................... 353/47–51, 7, 353/32–33, 27, 15, 13

(56) References Cited

U.S. PATENT DOCUMENTS 6,407,832 B1 * 6/2002 Holzbach et al. ............. 359/32

6,674,556 B1 * 1/2004 Mori et al. ................... 359/32

OTHER PUBLICATIONS

Berkhout, Rudie, "A Compact Hologram Display, and the Design for a Full–Color Version, Using Diode Lasers," SPIE Proceedings Series, Practical Holography XII, 1998, pp. 1–8, vol. 3293, SPIE.

Vacca, John R., "Holograms & Holography Design, Techniques & Commercial Applications," 2001, pp. 49–57, Charles River Media, Inc., Hingham, Massachusetts.

* cited by examiner

*Primary Examiner*—Fayez Assaf
(74) *Attorney, Agent, or Firm*—Christie, Parker & Hale, LLP

(57) ABSTRACT

An improved system is disclosed for displaying multi-image or animated holograms, in which the light that is used to illuminate the hologram is reflected to the hologram through one or more mirrors, and the angle at which the incoming light illuminates the hologram is varied over time.

17 Claims, 19 Drawing Sheets

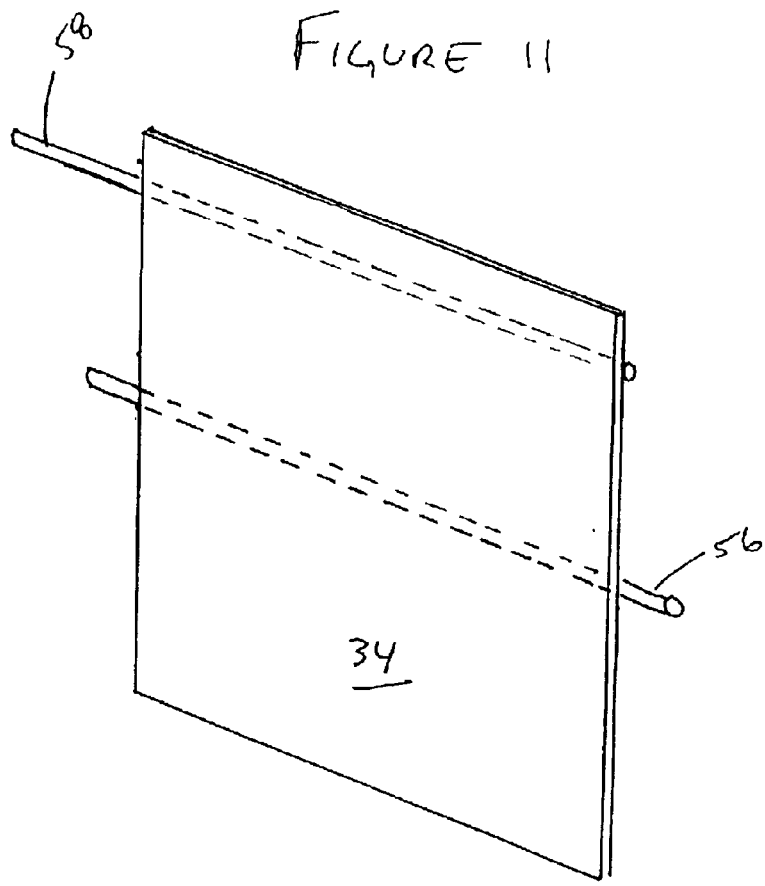
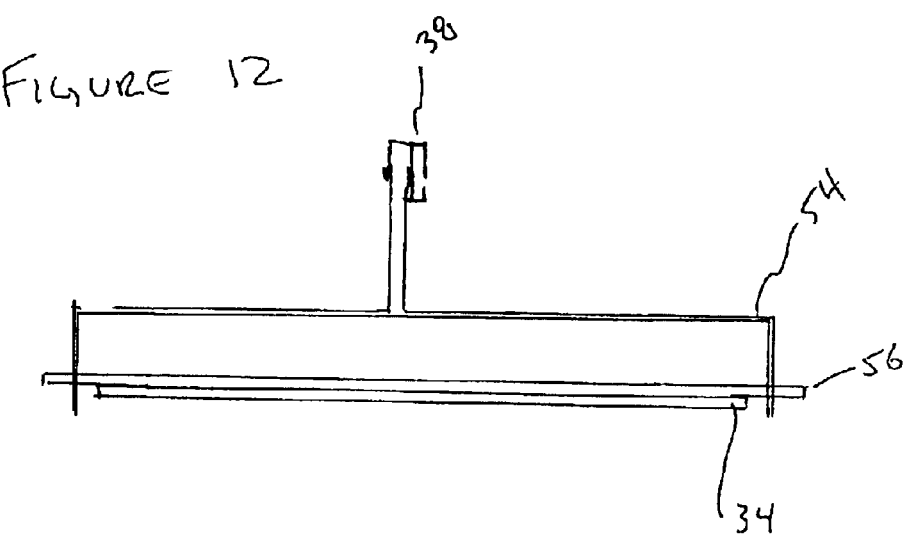

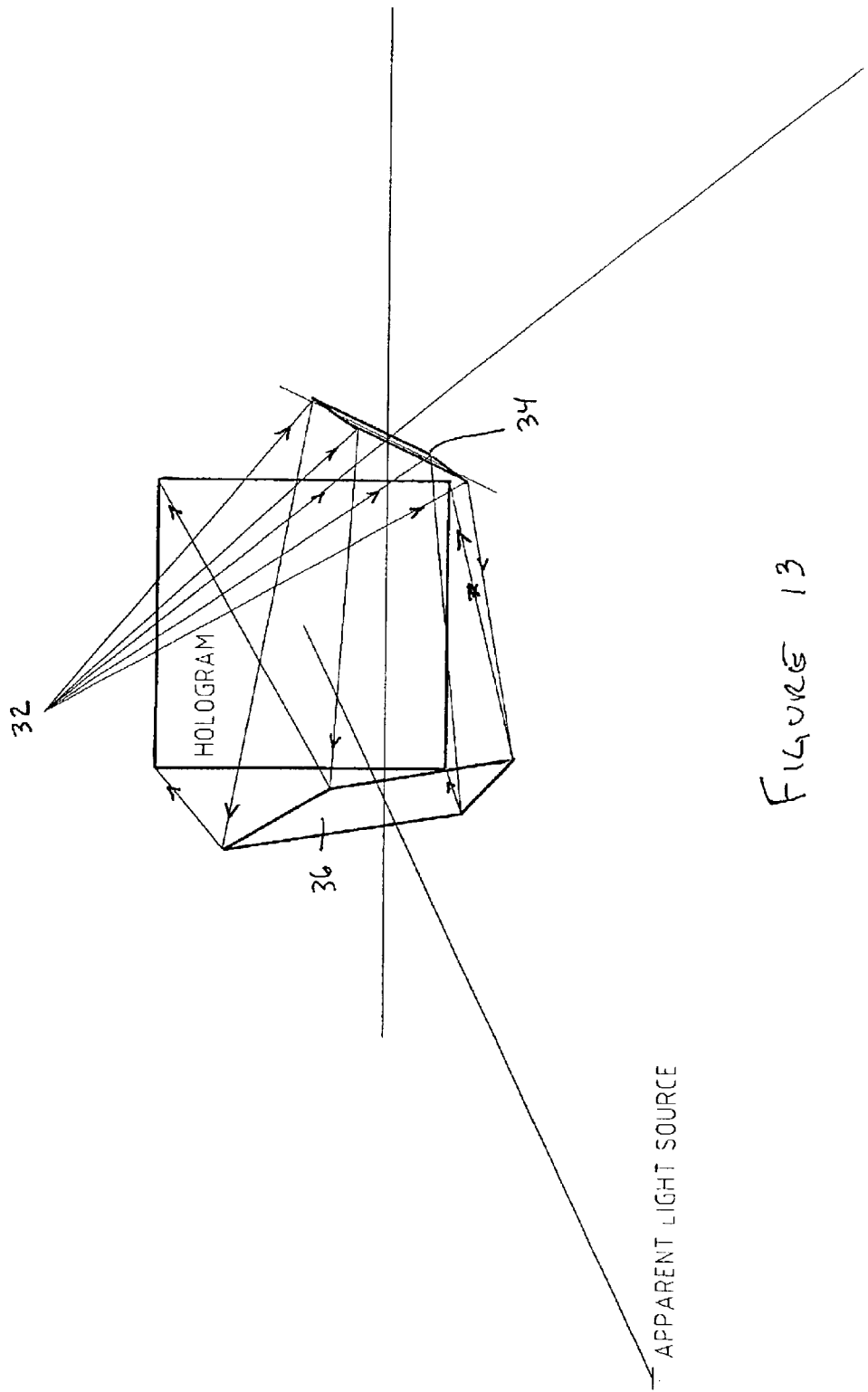

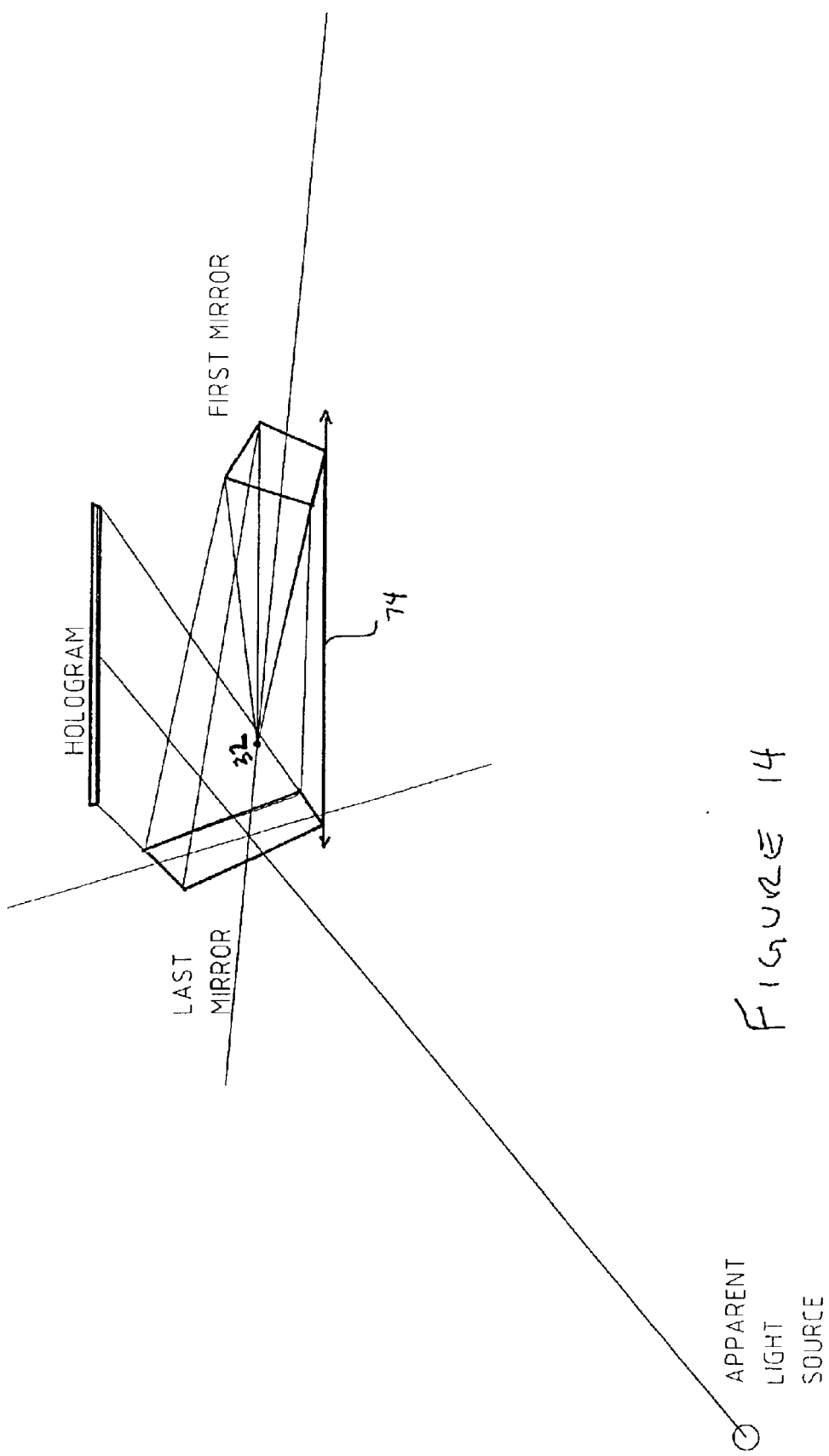

HOLOGRAPHIC DISPLAY SYSTEM

CROSS-REFERENCE TO RELATED APPLICATION

The present application claims the benefit of provisional patent application No. 60/311,450, entitled Improved Holographic Display System, filed Aug. 9, 2001, the contents of which are expressly incorporated herein by reference.

FIELD OF THE INVENTION

The present invention relates generally to the field of producing and displaying holographic images. More particularly, it relates to multiple-image holographic displays in which the distance from the hologram to its light source is preferably minimized, to permit the hologram and light source to be contained within a minimally sized enclosure.

BACKGROUND OF THE INVENTION

Where a hologram is to be displayed it can be important to minimize the distances from the hologram to the hologram's light source, while at the same time minimizing the intrusion of the light source into the viewing space. This is especially so when the light source is to be contained in an enclosure together with the hologram, and where it is desirable or necessary to limit the size of the enclosure.

For a substantially planar hologram, minimization of these distances substantially parallel to the hologram minimizes the width of the enclosure. Minimization of the distance substantially perpendicular to the hologram minimizes the depth of the enclosure. For a 600 millimeter×600 millimeter square planar hologram the minimum distance to the light source with present technology is approximately 1400 mm, and it will readily be appreciated that an enclosure depth of 1400 mm is a severe limitation on the display embodiments.

It is possible to reduce this depth by reflecting the light from the light source through mirrors, but there are significant limitations on the enclosure depth that still arise, and with present technology with a 600 mm square planar hologram, while illuminating all of the hologram, the minimum enclosure depth that results is 854 mm, which is still a severe limitation on the display embodiments.

This present limitation on the minimum enclosure depth arises because of certain characteristics of a hologram, which can be illustrated by reference to a planar reflection hologram as shown in FIG. 1. In FIG. 1, there is a planar hologram 10 (shown from the rear), that is viewable through an observable angle (beta) within a nominal viewing plane 12. The hologram is illuminated by light along a path 14. The illumination angle is defined as the angle between the light striking the hologram at a point and the normal (N) to the hologram at that point. There is an optimum illumination angle (alpha) between the incoming light to the hologram and the normal to the hologram where the light strikes the hologram, which gives optimum reconstruction of the light from the hologram.

For example, using parallel light striking the center of the hologram, the angle (alpha) might typically be 50 degrees from the normal to the center of the hologram, as shown in FIG. 1. It is possible to vary the illumination angle by plus or minus a certain number of degrees before the image produced disappears or suffers unacceptable distortion due to destructive interference of the wavefronts. The acceptable degree of variation might typically be 25 degrees, so that the actual illumination angle could vary between 25 to 75 degrees from the normal to the center of the hologram, while still producing an acceptable viewable image.

The range of acceptable illumination angles is a function of the grating spacing and thickness of the holographic film. A lower film thickness allows a greater illumination angle, but as the film thickness decreases, the diffraction efficiency decreases and because of this the brightness also decreases. There is therefore a practical limit that is reached. The grating spacing is determined by the wavelength of the light that is to be reconstructed, and hence, practically, by the need to view at least the primary colors red, blue and green. This is true even in the case of viewing a black and white hologram.

As the illumination angle is varied, it is possible to have the reconstructed light from the hologram show a different scene, forming an animated hologram. To avoid smearing of (or cross talk between) scenes of the animation, each scene must occupy a subtended angle which may be no less than a certain value. This dictates that there are a certain maximum number of different scenes that may be viewed by varying the illumination angle. This subtended angle is the angle subtended either by the lens of the eye at a given distance from the hologram in the case where the viewing plane is perpendicular to the plane in which the illumination angle is varied, or between the eyes on the viewing plane at a given distance from the hologram in the case where the viewing plane is parallel to the plane in which the illumination angle is varied. The subtended angle is much lower when the plane in which the illumination is varied is perpendicular to the viewing plane, and hence for a given variation in illumination angle, it is possible to have more scenes in this configuration. The different scenes may be arranged to be time-dependent views of the same scene and in this way varying the illumination angle gives rise to animation of the scene.

Because the number of scenes has a practical maximum, this means that the total amount of animation also has a practical limit. In either case it is desirable to be able to maximize the possible number of scenes, whether of animation or of static scenes.

Another limitation on enclosure size arises from the need to avoid having the light source in the field of view when viewing a reflection hologram through a viewing opening in the enclosure. The light source and all other physical parts must not be situated in the line of sight between the hologram and the viewing opening, but must stay outside or on an imaginary surface that includes all lines drawn from all points on the edges of the viewing opening to all points on the edge of the hologram, when viewed from each point on the edge of the viewing opening in turn. When the viewing opening and hologram are planar and parallel to one another, and the viewing opening is the same size as the hologram and is directly in front of the hologram, this surface consists of planes drawn from each side of the hologram coaxially with the perpendicular to the hologram. As shown in FIG. 2, in the case of the minimum illumination angle, the light source must be at least as far away as dimension D1 if it is not to encroach on the viewing opening. If the illumination angle is changed to 50 degrees, then the light source need only be distance D2 away from the hologram, but if this were the minimum illumination angle then the numbers of scenes viewable by altering the illumination angle would be decreased.

Even allowing for reflecting the light source through mirrors, with the above geometry, in the case of a 600 mm square hologram with a minimum distance from the center of the hologram to the light source of 1400 mm, to avoid intrusion of the light source into the viewing opening while still illuminating the complete hologram, the last mirror in the reflection chain may not be closer to the hologram than distance D1. This distance D1 is the minimum depth of any enclosure. With the above geometry, D1 is 854 mm which although less than the 1400 mm distance to the light source, still represents a severe limitation on the display embodiments.

SUMMARY OF THE INVENTION

In a basic aspect, the invention is a display system for a multi-image hologram (such as, for example, an animation hologram) that comprises a hologram, a light source, and at least one reflecting surface (generically referred to herein as a mirror) for reflecting light from the light source to the hologram, wherein the angle between the incoming light illuminating the hologram from the mirror and a normal to the hologram where the light strikes the hologram (i.e., the angle of illumination or illumination angle) is varied over time. The angle of illumination can be varied by moving the light source, or the mirror(s) or both. The components are preferably all contained within or on the surface of an enclosure having a viewing opening for viewing the hologram.

As used herein, reference to the light source means a physical light source or lamp that is used to illuminate the hologram. Reference to the incoming light means the light that shines on the hologram, typically after being reflected from the light source through one or more mirrors. Reference to an apparent light source generally means a virtual light source positioned at the location the actual incoming light source appears to be coming from when viewed from the illumination target.

In the preferred embodiment, the light from the light source is reflected through one or more mirrors (i.e., reflective surfaces) and the illumination angle of the light striking the hologram is varied in such a way that, for all particular points on the surface of angle alteration for the incoming light, a plane tangent to the surface of angle alteration (defined below) at that particular point is not always the same plane as the illumination plane (defined below) for that light source at that same particular point. Thus, for at least some points on the surface of angle alteration for the incoming light, a plane tangent to the surface of angle alteration at that particular point is not the same plane as the illumination plane for that light source at that particular point. This allows the depth of the enclosure to be reduced to D2, less than D1, while still maintaining the same number of scenes or frames of animation as if the distance was D1. With the geometry described above, and referring again to FIG. 2, D2 can be reduced to less than half of D1, while still maintaining the same number of scenes or frames of animation as if the distance was D1. It will be appreciated that the reduction in enclosure depth by such a large margin greatly increases the number of possible practical display embodiments and their usefulness. In practical terms it allows a hologram to be mounted in an enclosure or cabinet with a self-contained light source and of a depth acceptable for mounting on, against or at least partially within a wall. Without this depth reduction, this is not practically possible in many situations because any the enclosure, including its light source, would intrude substantially into the room space where the hologram was to be displayed. One specific application in which this aspect of the invention would be useful is in the case of a holographic fireplace display, in which it would be desirable to be able to fit all of the components of the display (including the light source) within the confines of a standard fireplace, despite the enclosure being relatively shallow from front-to-back. Another specific application is in point of sale displays, for example in the front panel of a vending machine.

The surface in which the illumination angle is altered, or the surface of angle alteration for a particular apparent light source, is the surface that is the locus of all lines drawn from the nominal center of the apparent light source to the corresponding point of greatest light intensity on the hologram, as the position of the apparent light source for the light illuminating the hologram varies.

For example, referring to FIG. 3, a planar hologram is shown having a line N normal to its center. If the direction of the incoming light (or the location of the apparent light source) is varied between paths A, B and C, the surface of angle alteration would be a surface that includes all those paths (and all other paths that are followed as the direction of the light source is moved between points A, B and C). If the apparent light source is moved linearly between positions A, B and C, the surface will be a flat plane, as shown by plane 14 in FIG. 3.

As the angle of illumination is varied, and the path of the incoming light to the hologram changes, there is a different illumination plane associated with each different pathway. The illumination plane for any position of the incoming light (or the corresponding apparent light source) is the plane that includes both (1) the imaginary line drawn between the center of the incoming light (or the corresponding apparent light source) and the corresponding point of greatest light intensity on the hologram and (2) the imaginary line normal to that corresponding point. In FIG. 3, the illumination plane 16 is shown when the apparent light source is at location A. The plane includes (1) the line from location A to the center of the hologram and (2) the line normal to the center of the hologram. The illumination plane for any position of the incoming light will intersect the plane (or surface) of angle alteration, because both planes include the line between the incoming light source at that position and the center of the hologram.

Alternatively, the nominal illumination line of a particular apparent light source is the line drawn from the nominal center of the apparent light source to the corresponding point of greatest light intensity on the hologram. The surface of angle alteration is the surface that is the locus of all nominal illumination lines as the position of the corresponding apparent light source for the light illuminating the hologram varies. This surface may be disjoint as for example in the sense of consisting of for example, several planes intersecting each other at angles.

In one embodiment, the hologram display system is characterized in that, for any part of the hologram, the surface of angle alteration is not the same as any optimum illumination plane, and all optimum illumination planes are within 50 degrees of the nominal viewing plane. An optimum illumination plane is defined as the plane of points on an optimum illumination angle line and the line of the normal to the hologram used to define that optimum illumination angle. For a given incoming light source on a planar hologram, there is only one optimum illumination plane. In a related embodiment, the hologram is a planar hologram and for any incoming light to the hologram, the surface of angle alteration and the optimum illumination plane are 90 degrees apart, or about 90 degrees apart.

Another embodiment comprises a hologram display system in which the surface of angle alteration is not the same as any optimum illumination plane, and all optimum illumination planes are within 50 degrees of the nominal viewing plane. The nominal viewing plane is defined as the horizontal plane through the center of the hologram when the hologram is aligned in a manner suitable for viewing. The actual viewing plane, (which is the plane defined by the nodes of the lenses of the eyes and the center of the hologram) may differ from the nominal viewing plane.

Another embodiment comprises a reflection hologram display system wherein a hologram is at least partially enclosed and at least one mirror is interposed between the light source and the hologram so that the distance from an edge or apex of the mirror is within the larger of either 500 mm, or thirty percent of the largest dimension of the hologram, from any surface of a volume defined by the shape of the viewing opening projected along the normal to any part of the hologram.

In another embodiment, a reflection hologram display system has at least one hologram at least partially enclosed and at least one mirror is interposed between a light source illuminating the hologram so that no part of any mirror is contained within a volume defined by the shape of the viewing opening projected along the normal to any part of that hologram.

In another embodiment, a reflection hologram display system is characterized in that any mirror that sends light originating from any light source in a straight line to the hologram is arranged so that the angle at which at least one incoming light path to the mirror for reflecting light to the hologram is within 20 degrees of a line drawn through the point of reflection parallel to a plane tangential to the hologram where that light path strikes the hologram.

In another embodiment, a reflection hologram display system is characterized in that any mirror that sends light originating from any light source in a straight line to the hologram is arranged so that the angle at which any incoming light path to the mirror does not pass through and beyond a plane parallel to the plane tangential to the hologram where that light path strikes the hologram, with the parallel plane positioned through the point on the mirror which has the greatest distance to the hologram in the direction of the normal to the hologram where that light path strikes the hologram.

In another embodiment, a reflection hologram display system having first and second reflective surfaces for reflecting light from a light source to first mirror, and from the first mirror to the second mirror, and from the second mirror to the hologram is characterized in that the edge or point of the first mirror that is most distant from the hologram is no further away from the hologram than the edge or point on the second mirror that is furthest away from the hologram. In a related embodiment, the first mirror that is most distant from the hologram is within 50 to 150 percent of the distance from the hologram of the edge or point on the second mirror that is furthest away from the hologram.

In another embodiment, a hologram display system uses at least one partially mirror such that the outline of the portion of the surface that reflects 50 percent or more of the incident light on that portion encompasses only the area necessary to reflect light to the hologram so that all parts of the hologram are illuminated by the reflected light for all the required angles of alteration to cause the reconstruction of the chosen scenes contained within the hologram.

In another embodiment, a hologram display system utilizes at least one partially mirror such that the outline of the portion of the surface that reflects 50 percent or more of the incident light on that portion encompasses between 70 percent and 130 percent of the minimum area necessary to reflect light to all parts of the hologram so that the hologram is illuminated by the reflected light for all the required angles of alteration to cause the reconstruction of the chosen scenes contained within the hologram.

In another embodiment, a hologram display system utilizes at least one mirror such that the incoming light path to the mirror that subsequently reaches the center of the hologram is within 15 degrees of the nominal viewing plane of the hologram.

In another embodiment, a hologram display system includes at least one mirror and at least one hologram curved so that the illumination angle of all light in the nominal viewing plane reaching the hologram from a specific mirror is within 5 degrees of the same value.

DESCRIPTION OF THE DRAWINGS

FIG. 11 is a perspective view of a mirror for use in a system in accordance with the present invention, showing the pivot rod and pivot control rod.

FIG. 12 is a top view of a mirror and mounting bracket for mounting the mirror to a drive belt in one embodiment of a system in accordance with the present invention.

FIGS. 13 and 14 illustrate the path of light reflected from a light source to a hologram through two mirrors in accordance with one embodiment of the present invention, from in front of the display and from above the display.

DETAILED DESCRIPTION OF SPECIFIC EMBODIMENTS

Figure 1:
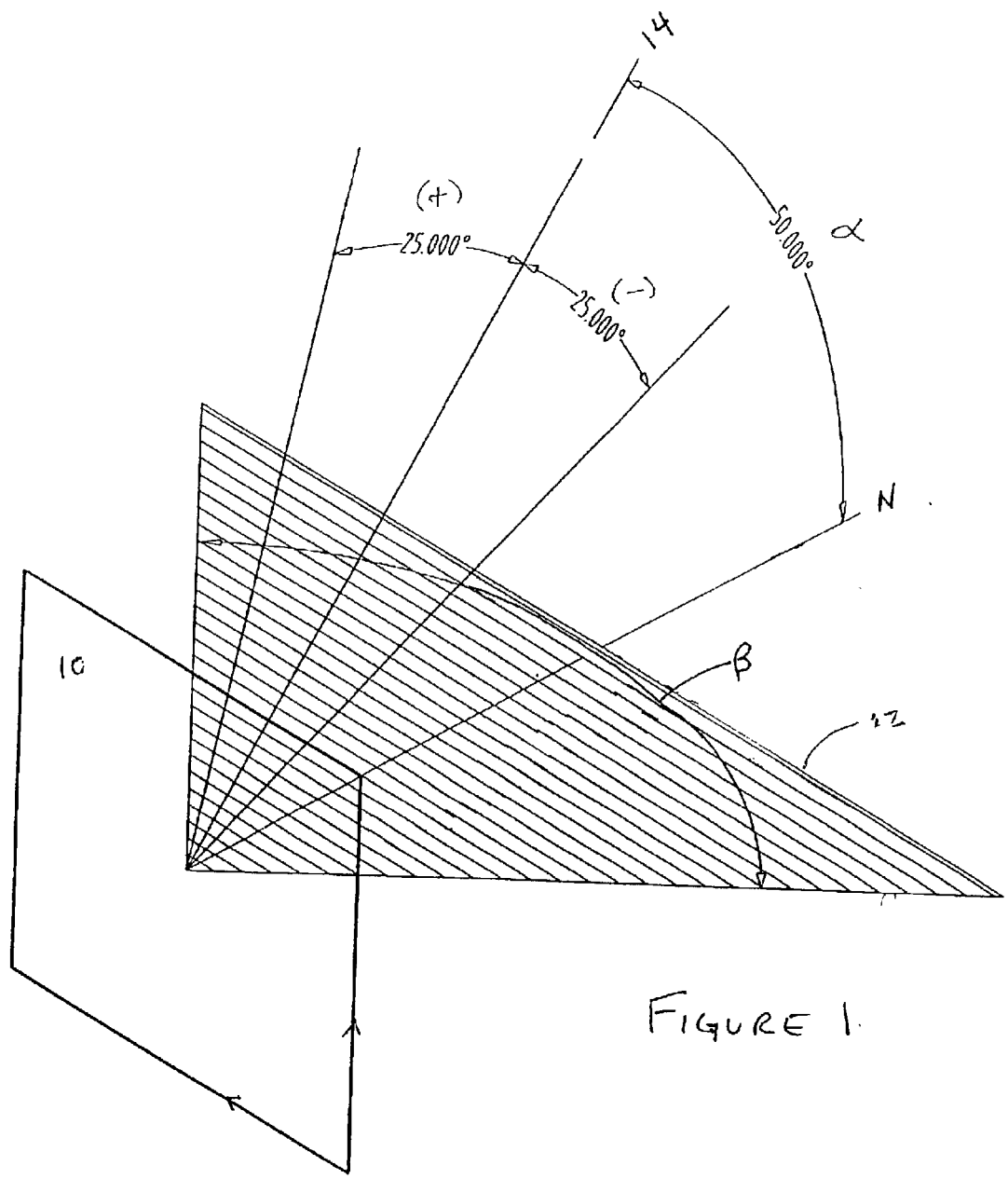
FIG. 1 is a perspective view of a flat planar hologram showing the viewing plane and angle of orientation of incoming light.
Figure 2:
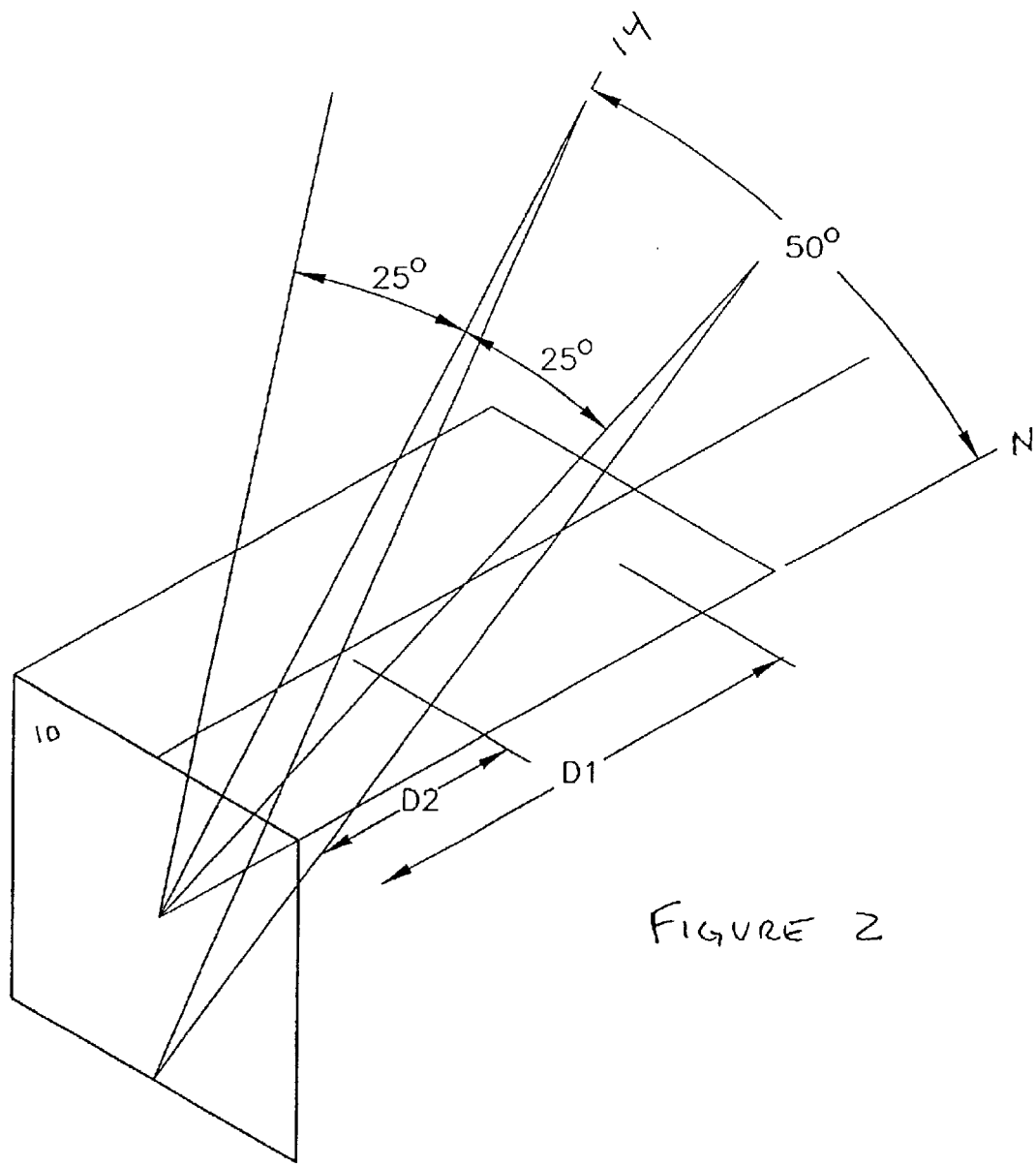
FIG. 2 is a perspective view of a flat planar hologram showing the relationship between angle of illumination and enclosure depth.
Figure 3:
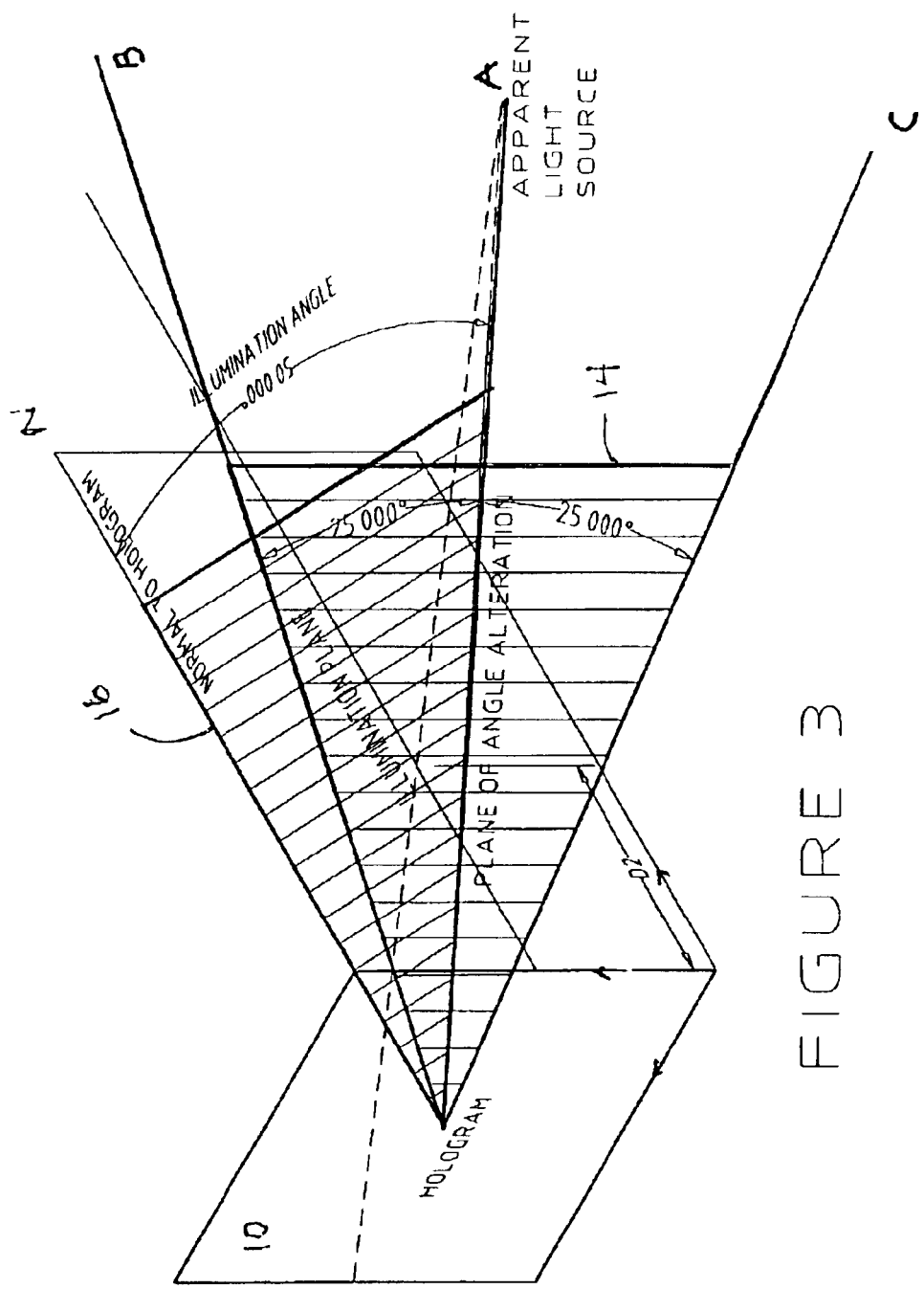
FIG. 3 is a perspective view of a flat planar hologram showing a surface of illumination and a surface of angle alteration.
Figure 4:
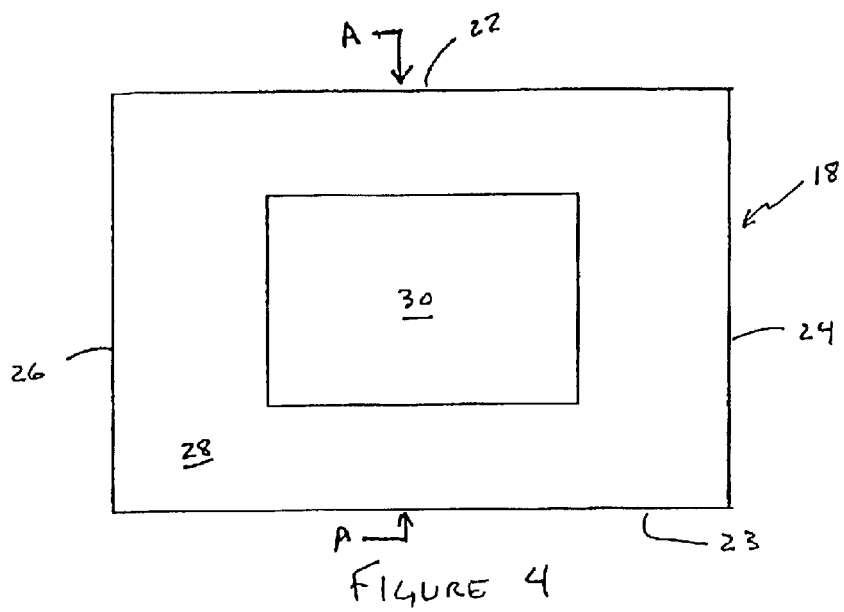
FIG. 4 is a viewing taken from the front of a hologram display system according to the present invention, showing details of the enclosure.
Figure 5:
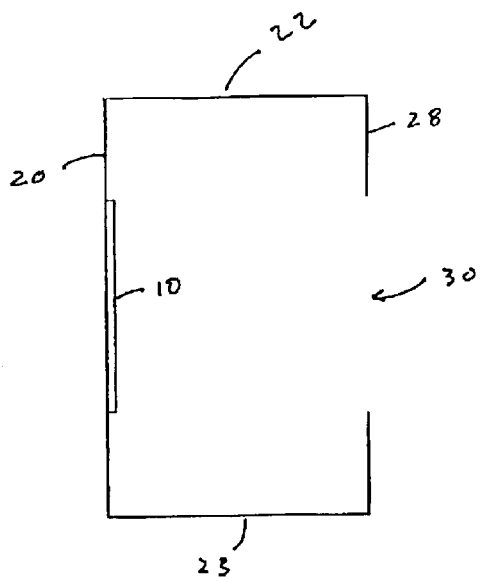
FIGS. 5 and 6 are, respectively, left and right side views of the enclosure in FIG. 4, taken along the line A—A in FIG. 4.
Figure 6:
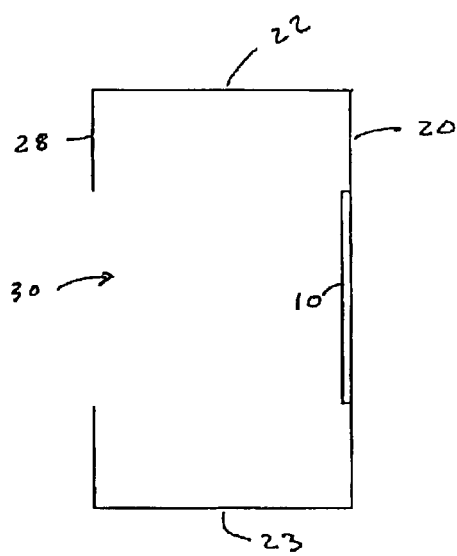
Figure 7:
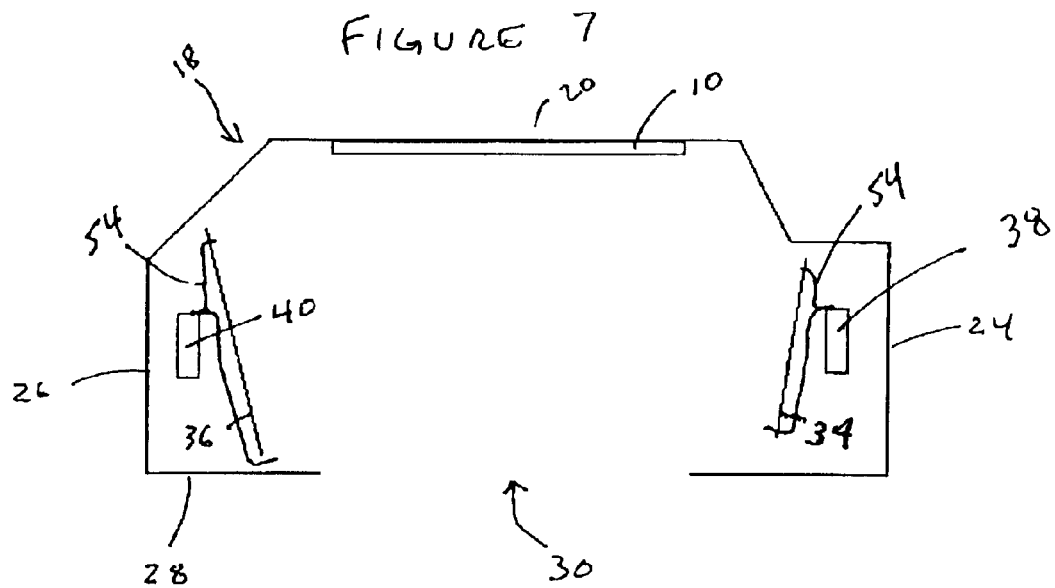
FIG. 7 is a top plan view of a display system in accordance with the present invention, with the top of the enclosure removed to show the relationship of the hologram and mirrors within the enclosure.

The present invention can be implemented using a variety of combinations, numbers and configurations of light sources and mirrors, and by moving either the mirror(s) or the light source(s) or both. The embodiments described below are examples of configurations that can be used to practice the invention.

It will be appreciated that the examples described below are based on illuminating all of the hologram from the light source. It is possible to reduce the distances given by not illuminating all parts of the hologram. This results in loss of detail in the reconstructed image, and is essentially the same as the result achieved by using the constructions given on a smaller hologram. A similar situation occurs for transmission holograms, but in that case the problems associated with blocking the viewing opening are not present, because the transmission hologram is illuminated from behind, rather than from the front as in the case of a reflection hologram. In contrast, the limiting case giving the minimum enclosure size is obtained by positioning the closest point of the last mirror on the edge of the hologram.

FIGS. 4 through 16 show the details of one exemplary hologram display according to the present invention, in which the light source is reflected onto the hologram through two mirrors that move in coordination with one another.

Referring first to FIGS. 4–8, the display generally includes an enclosure 18 for enclosing a hologram 10 and its associated components. The enclosure can be made from any of a variety of materials, including sheet metal for ease of fabrication. It includes a back portion 20, a top portion 22, bottom portion 23, first and second side portions 24 and 26, and a front portion 28 having a viewing opening 30. As shown in FIGS. 7–10, the enclosure houses a hologram 10 preferably mounted to the inner back surface of the enclosure. It also houses a light source 32, and one or more mirrors (in this case first and second mirrors 34 and 36) as well as other components (described below) for permitting coordinated movement of the mirror(s) and the light source.

Figure 8:
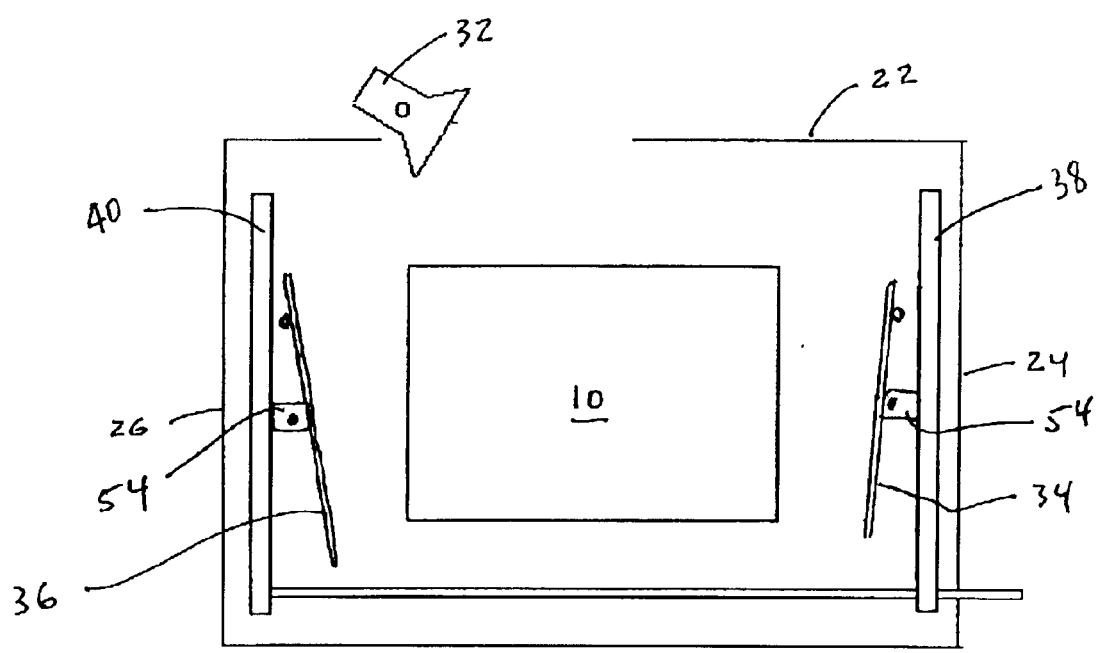
FIG. 8 is a front view of the display system shown in FIG. 7, with the front of the enclosure removed and showing a system for moving the mirrors in coordination.
Figure 9:
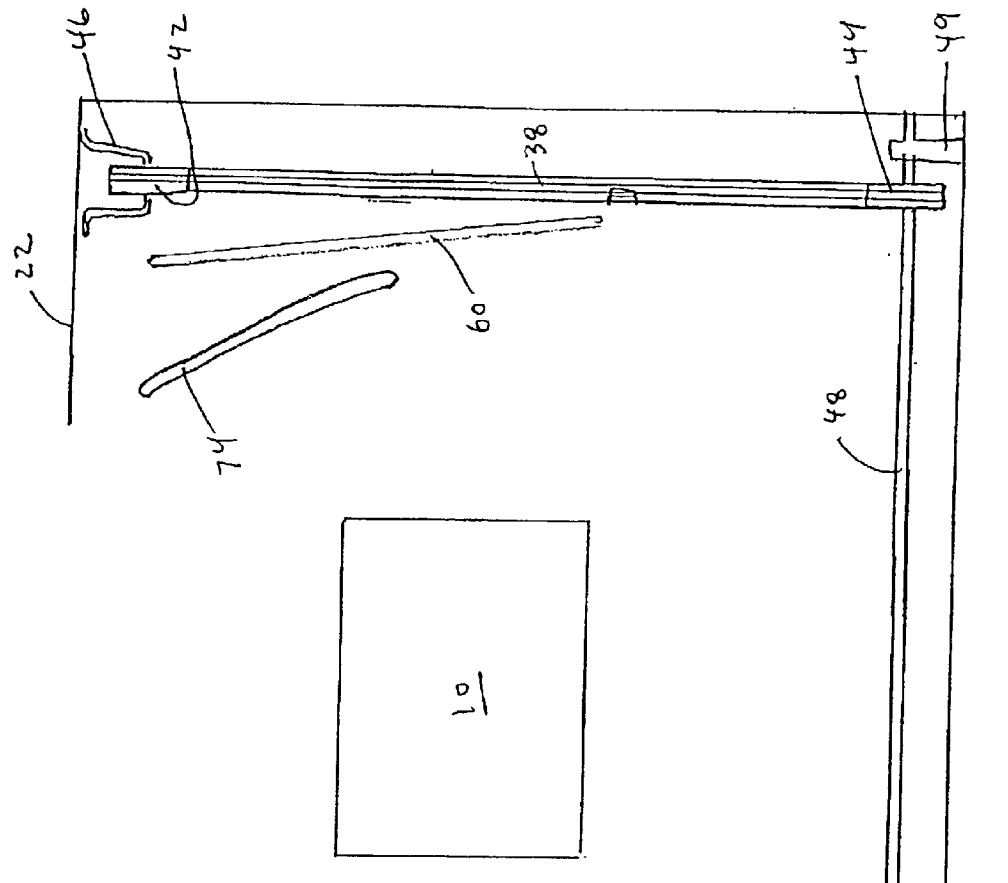
FIG. 9 is a front view of the display system in accordance with the present invention, with the front of the enclosure removed, showing the details of various slots and openings in the enclosure.

FIGS. 8–12 show the details of the arrangements for coordinating movement of the mirrors and the light source. As shown in FIGS. 8 and 9, the first mirror 34 is pivotally attached to a first vertically oriented belt 38 at one side of the enclosure, and the second mirror 36 is pivotally attached to a second vertically oriented belt 40 at the opposite side of the enclosure. As shown in FIG. 9 (in which the mirrors are not shown to reveal underlying structures), each of the belts turns on an upper pulley 42 and a lower pulley 44 respectively connected to the top of the enclosure by tensioning brackets 46. The upper or lower pulleys (and preferably the lower pulleys) are supported and turned by a drive mechanism, causing the belts to turn in unison and thereby move the mirrors up and down in unison within the enclosure. The drive mechanism can be a drive shaft 48 supported by bearings 49 that extends through the center of the drive pulleys 44, and a motor 50 for turning the shaft to move the belts. The motor 50 can be any of a number of different types, but is preferably a stepping motor controlled by a microprocessor. The motor can also be a speed controlled AC motor operating through a geared reduction with reversing clutches. It would be possible to use a DC motor, but it is believed that reliability would not be as good as with an AC motor.

The direction or speed of movement of the mirrors can be controlled by controlling the direction or speed of rotation of the motor via a controller 52 (such as a microprocessor) or some other means. The shaft 48 can be rotated in a regular pattern to raise the mirrors up and down to the same points in a repeating cycle, or to raise and lower them together in a random or varying pattern. For instance, in the case of a holographic fireplace display or other similar scene, a non-repetitive pattern of movement for the mirrors is desirable to avoid constantly repeating the same sequence of scenes from the hologram.

As the angle of alteration changes, both mirrors move in the vertical (Z) direction. The mirrors are required to rotate also, so that the light path from the center of the hologram to the light source is the same. This means that the last mirror is required to rotate in the XZ plane (parallel to the hologram) and the XY plane (orthogonal to the hologram), and the first mirror is required to rotate in the XZ plane. Thus, as the first and second mirrors move up and down within the enclosure, they also pivot to ensure that the light source will be reflected continuously onto the center of the hologram. To accomplish this, each of the mirrors is pivotally attached to the corresponding belt via a bracket 54 fixed to the belt, as best shown in FIGS. 8, 11 and 12.

As shown in FIG. 11, each mirror has a pair of generally horizontal rods glued or otherwise fixed onto the back of the mirror. The first rod 56 extends beyond both sides of the mirror and extends through holes in the bracket 54 on either side of the mirror, as shown in FIG. 12 with respect to the first mirror 34. A similar arrangement is provided for the second mirror 36.

The second rod 58 in each mirror extends beyond the edge of the mirror adjacent the rear of the enclosure, and is used to control the pivoting of the mirror as it moves vertically with the belt. As shown in FIG. 9, first and second slots 60 and 62 are cut into the enclosure, preferably on the rear 20 of the enclosure. The rod 58 of the first mirror 34 extends into the slot 60, and the rod 58 of the second mirror extends into the second slot 62. Each slot is shaped so as to cause the associated mirror to pivot about the pivot rod 56 as the mirror is moved up and down inside the enclosure, to ensure that the mirror will be angled properly as it moves up and down within the enclosure. The specific angles at which the mirrors are mounted, and the specific shape of the slots that guide the pivoting of the mirrors, will of course vary depending on the shape and size of the enclosure, and geometry of the specific display.

Figure 10:
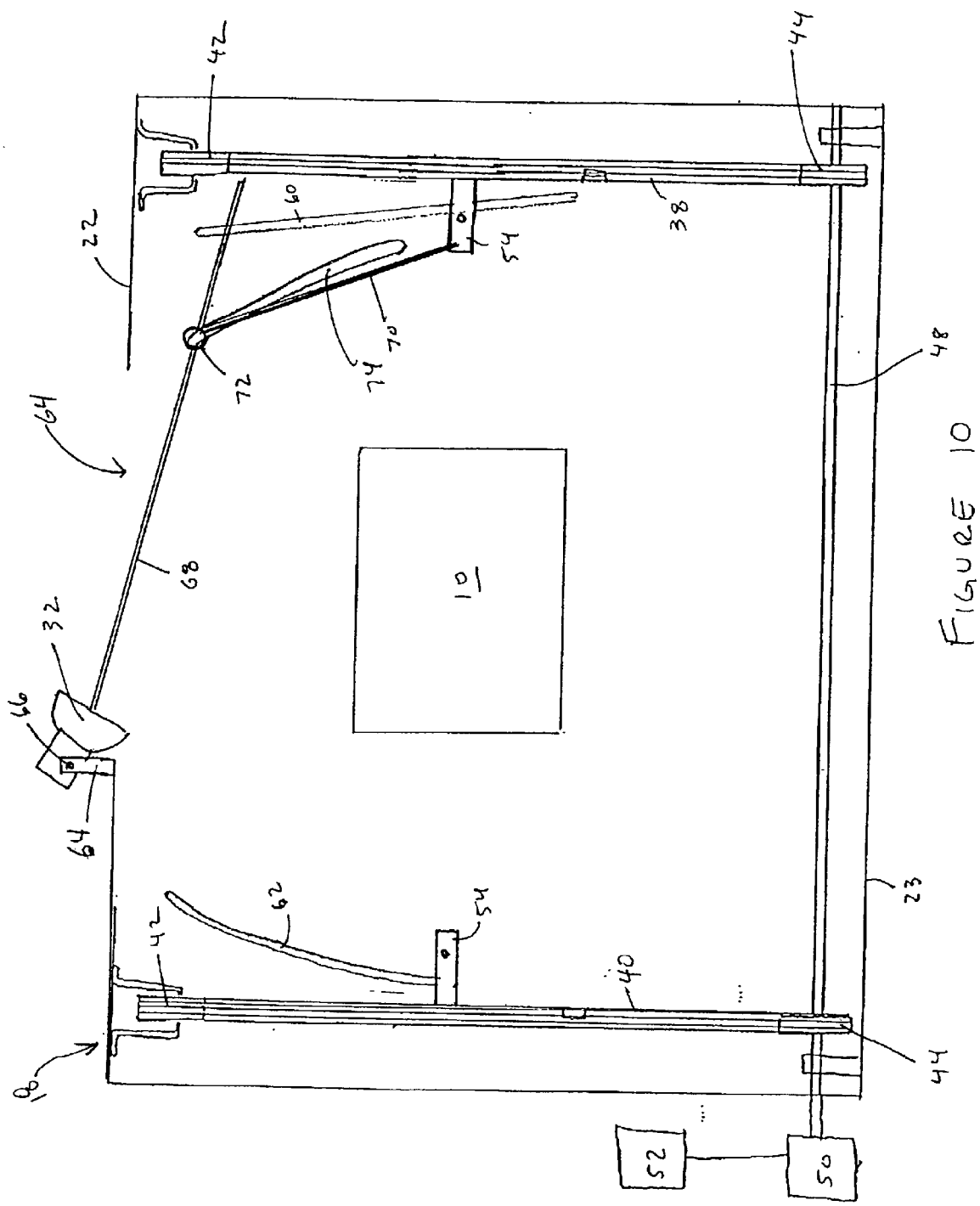
FIG. 10 is similar to FIG. 9, with the addition of a mechanism for coordinating movement of the light source and a mirror.

As shown in FIG. 10, the light source 32 in the embodiment shown is preferably mounted in an opening 64 in the top of the enclosure, and is adapted to track the movement of the first mirror 34, so as to shine directly onto the first mirror 34 even as the mirror moves up and down within the enclosure. The light source 32 is pivotally mounted to the enclosure 18 via a bracket 64 that carries an axle 66 extending through the light source assembly, allowing the light source to pivot in the bracket. To coordinate the movement of the light source 32 and the first mirror 34, the first mirror 34 and the light source 32 are linked together via a rod 68, a member 70 and a bushing 72 that is attached to the end of the member 70. The member 70 is attached at one end to the belt (for example to the bracket 54 that holds the first mirror 34 to the belt) and moves up and down with the mirror. The bushing 72 is attached to the upper end of the member 70, and a portion of the bushing engages a slot 74 in the back of the enclosure, shown in FIGS. 9 and 10. As the mirror moves up and down, the bushing 72 slides within the slot 74.

The rod 68 extends from the light source 32 and through a bore in the bushing 72. As the bushing 72 moves within the slot 74, the adjacent end of the rod 68 is lifted or lowered, thereby causing the light source to pivot. The rod 68 is able to slide within the bore in the bushing 72, to accommodate the movement of the bushing relative to the light source.

As shown in FIGS. 13 and 14, as the first and second mirrors 34 and 36 move up and down with the rotation of the belts, they are coordinated with one another, and with the light source 32, to ensure that the light from the light source 32 will be continually directed onto the hologram. At any instant, the effect is the same as if a direct light source (shown as the apparent light source in FIGS. 13 and 14), much farther from the hologram 10 than the actual light source 32, was being used to illuminate the hologram.

The orientation of the last mirror in the chain of mirrors from the light source to the hologram may have an influence on the depth of an enclosure. Keeping in mind that the mirrors should not move so as to be visible through the viewing opening of the enclosure, the last mirror may not be rotated clockwise (when viewed from above) beyond some point without increasing the overall depth of the enclosure. As shown in FIG. 14, the distance from an imaginary line 74 across the front edges of the mirrors (i.e., the edges closest to the front of the enclosure) to the center of the hologram would be greater than the distance from the end of the last mirror to the center of the hologram. In addition, if the last mirror is rotated too far counterclockwise (when viewed from above), then the overall width of the enclosure must increase.

The minimum vertical size of the enclosure is determined by the distances of the extreme top and bottom edges of the last mirror above and below the hologram respectively at the mirror positions given by the maximum angles of alteration. It is possible to rotate the first mirror so that the mechanical parts of the light source do not extend outside the enclosure size dictated by this.

It is also desirable to minimize the amount of light not coming directly from the hologram that can emanate from the enclosure. This gives the greatest sharpness and contrast to the viewed image, and can be thought of as giving the best signal to noise ratio. Because of this it is desirable to ensure that only the necessary light reaches the hologram and that all other light is blocked and/or attenuated before exiting the enclosure. It is therefore desirable that the mirrors are only of sufficient size to just illuminate the hologram at all the allowable angles of alteration. As shown in FIG. 14, the first mirror is in a position such that the horizontal distance from the outermost edge of that mirror is the same distance from the edge of the hologram as the distance from the hologram to the outermost edge of the last mirror. This gives horizontal symmetry to the enclosure, while still maintaining the minimum horizontal enclosure size. It is also possible to arrange the first mirror so that the beam from the center of the hologram to the light source becomes vertical before the first mirror, but this is at the expense of additional horizontal width of the enclosure. That does, however, increase the efficiency of illumination and also means that the first mirror does not need to rotate as the angle of alteration changes.

It is advantageous to have the light path to the center of the hologram being horizontal (i.e., in the nominal viewing plane) before the last mirror. This minimizes the horizontal size of the enclosure for a given number of frames to be viewed. The maximum angle of alteration for the last mirror is then plus and minus the same angle about the horizontal, and this means that the distance of the edge of the mirror furthest away from the hologram is minimized. If the light path was not horizontal, then the maximum angle above the horizontal for the last mirror would not be the same as the maximum angle below the horizontal, and the furthest away edge of the mirror would be greater for the case of the largest of these two angles.

Figure 15:
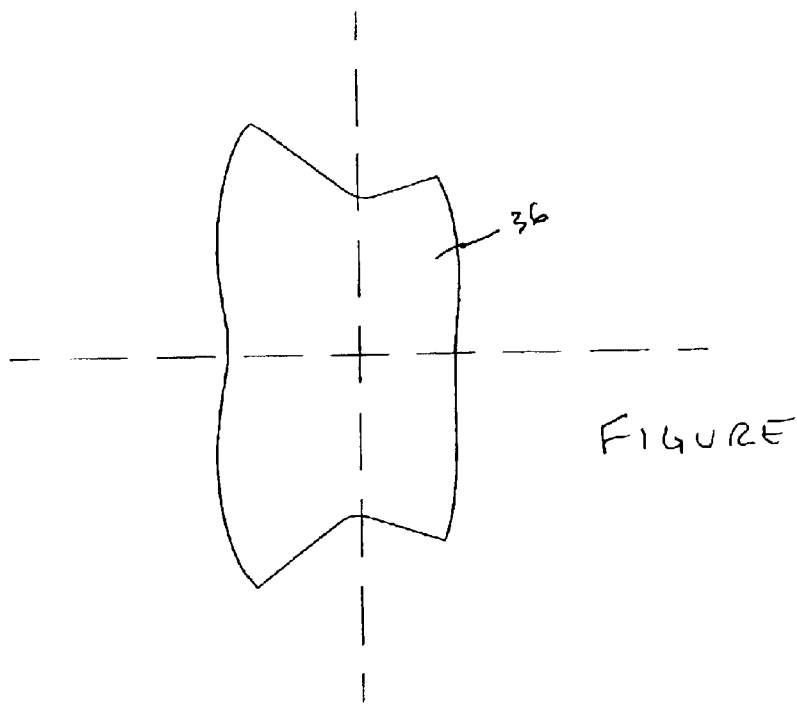
FIGS. 15 and 16 show exemplary shapes of first and second mirrors for use in one embodiment of the present invention.
Figure 16:
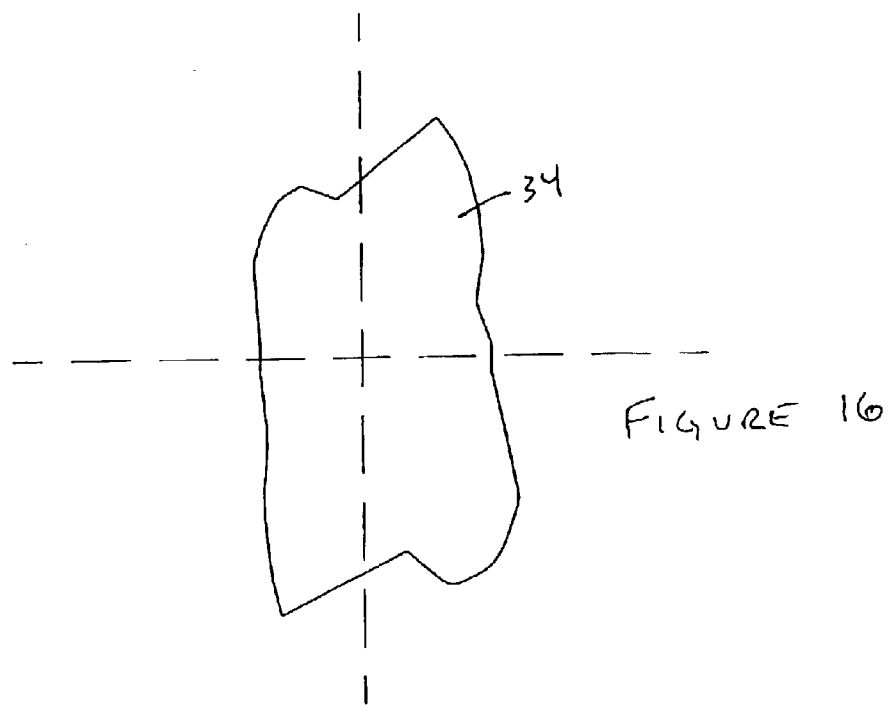

The sizes of the mirrors shown in FIGS. 15 and 16 are the minima for those mirrors for the specific angle of alteration such that all parts of the hologram are illuminated. As the angle of alteration changes, so the positions and shapes of these mirrors change. To have fixed mirror sizes for all the angles of alteration needed for a given design, the minimum mirror sizes are given by the loci of the corresponding corners of the mirrors for all the mirror shapes for all the possible mirror positions. The geometries shown in FIGS. 13 and 14 give rise to mirror shapes similar to those shown in FIG. 15 for the last mirror and in FIG. 16 for the first mirror. The mirror shapes can be attained, for example, by cutting reflective sheet material to the patterns shown in FIGS. 15 and 16, or by using a rectangular or other shape and coating or blanking it so that the highly reflective portions of the sheets correspond to the shapes shown. Different geometries for the light source and mirrors will of course give rise to different mirror shapes, but the principle remains the same.

As the distance to the point light source increases, the last mirror changes so that the distance from its extreme left-hand edge to the edge of the hologram becomes less, and therefore the overall width of the enclosure becomes less. There is therefore a maximum distance for the point light source to the hologram such that the mechanical parts of the light source just reach the extreme left hand edge of the last mirror. It is this geometry that gives the least size enclosure for a given hologram.

It can be seen that these arrangements give rise to a minimum size for an enclosure for a given size hologram, when the hologram, light source and mirrors are arranged such that for all particular points on the surface of angle alteration for the light that illuminates the hologram, a plane tangent to the surface of angle alteration at that particular point is not always the same plane as the illumination plane for that light source at that same particular point. It will be appreciated that certain small variations in mirror positions and angles close to the optima described will also give acceptable viewing results, while compromising the enclosure size only slightly.

The diagrams given have been shown with respect to a planar hologram and a coplanar viewing opening. However the same principles apply to curved or non-planar holograms and to non-planar viewing openings. In the case of non-planar holograms, the hologram can be thought of as being constructed of a series of finite planar elements joined at their edges, and the principles and diagrams can be applied to each element in turn. In practice holograms may be thought of or actually made up of individual holographic elements called hogels. The principles and diagrams may be applied to each hogel.

This method can also be used for holograms that are curved in two planes substantially at right angles to each other. It is possible to significantly reduce the distance to a point light source even when mirrors are not used by curving the hologram so that the normal to the hologram at a particular point is displaced towards a line drawn from the point to the light source. This has the effect of reducing the angle of incidence and therefore allows the light source to be brought closer to the hologram before the reconstruction of the scene is affected.

Where the scene being viewed is an animation, it is desirable that the animation be viewed at a set frame rate. In order to give a realistic movement to the scene it is necessary to change the illumination such that different frames are seen at between nominally 24 to 30 frames per second. This is the same limitation as for a film or a video of an animated scene and is related to the need for the viewer to see a smoothly altering scene. If the frame rate alters from the nominal rate, then the animation appears to speed up or slow down. By altering the speed with which the mirrors move in the Z direction it is possible to alter the rate of animation, and objects in the scene appear to speed up or slow down. This may be used in the case of a fire scene for example to change between a fast highly active flame and a slow lazy flame. In addition, since the vertical distance between scenes varies with the Z position of the mirrors, for a constant chosen animation rate, it is necessary to vary the speed in the Z direction for the mirrors to maintain a fixed animation rate. For many animations this is a critical factor: failure to alter the mirror speed in the Z direction may give rise to undesirable variations in animation rate which detract from viewing. In other cases, varying the speed may give rise to special effects that are desirable.

As noted above, animation of holograms is achieved by varying the angle of illumination from the incoming light to the hologram. This causes a viewer to see different images of the same scene shifted in time relative to the preceding image as the illumination angle advances in a given direction. In this way the scene appears to animate. There are fixed limits to the numbers of frames that may be reconstructed from a given hologram. This means that there is a fixed limit to the duration of the animation before the animation ceases, reverses or repetition occurs. It is desirable in many uses to maximize the duration of animation between repetitions.

With some types of animations it is not possible to discern whether the animation is going forwards or backwards with respect to time. Some examples are a field of flowers waving in a swirling wind, a flame in a fireplace, or a panning view of a bird against a cloudless sky. This type of animation is said to be isochronous. For isochronous animation, it is possible to achieve an extremely large number, or even an infinite number of animation sequences before any repetition occurs. This may be done by changing the angle of illumination to the hologram such that the angle increases in a given direction, and then reverses direction from time to time. Depending on the actual scene to be animated, this may be on a random basis, a timed basis, or may be keyed to specific frames.

For example, where there are 150 frames of the scene which constitute the animation, the animation could advance to say the $50^{th}$ frame, then reverse to say the $39^{th}$ frame, then advance to say the $75^{th}$ frame etc. This would represent three sequences. These types of sequences may continue for a very large, or even an infinite number of sequences before any actual repetition of a sequence is necessary. By this means the time between actual repetitions of a sequence may be significantly extended.

For some scenes it may be necessary to define the actual sequence of frames where the animation reverses to ensure that the animation appears to behave in way that we would expect. For other scenes a random or timed reversal may be sufficient. Some animation sequences that are not isochronous may be made isochronous by removing any non-isochronous elements from each frame before encoding it in the hologram. For example, a fire may generate smoke or sparks, and the animation of these in reverse would be anomalous. Removing these elements from each frame would leave an isochronous animation. The above-described technique for extending animations may be used with any of the display systems disclosed or claimed herein, but is not limited to such systems or to any other type of display or display system and is equally applicable to other display systems.

FIGS. 17 through 26 show another embodiment that is particularly advantageous with holograms that allow high illumination angles, such as those having optimum illumination angles approaching about 70 degrees. The embodiment does not require any moving mirrors. Instead, it comprises a single fixed mirror, and two light sources that move in unison.

Figure 17:
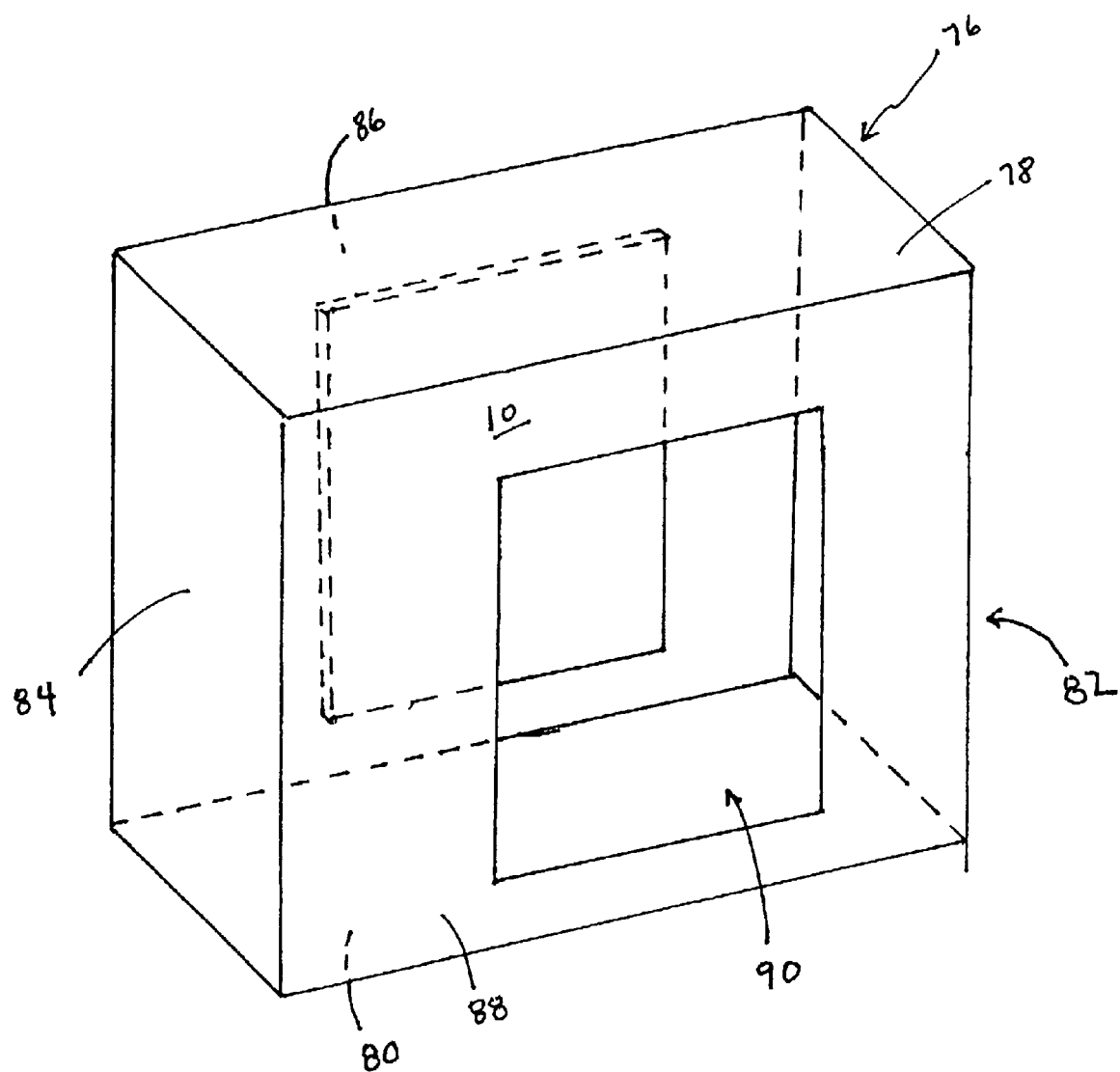
FIG. 17 is a perspective view of an enclosure for display system in accordance with the present invention.
Figure 18:
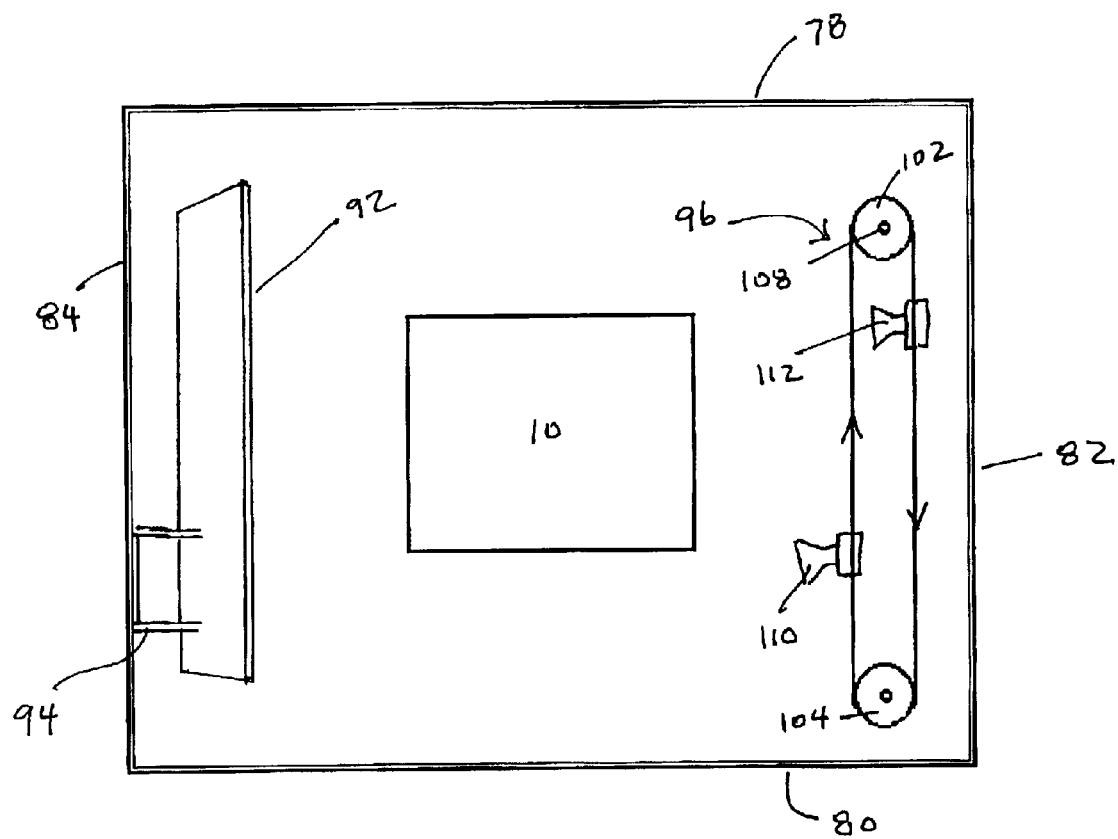
FIGS. 18, 19 and 20 are front, top and side views of an embodiment of the present invention, showing the relationship between the hologram, mirror and light source apparatus.
Figure 19:
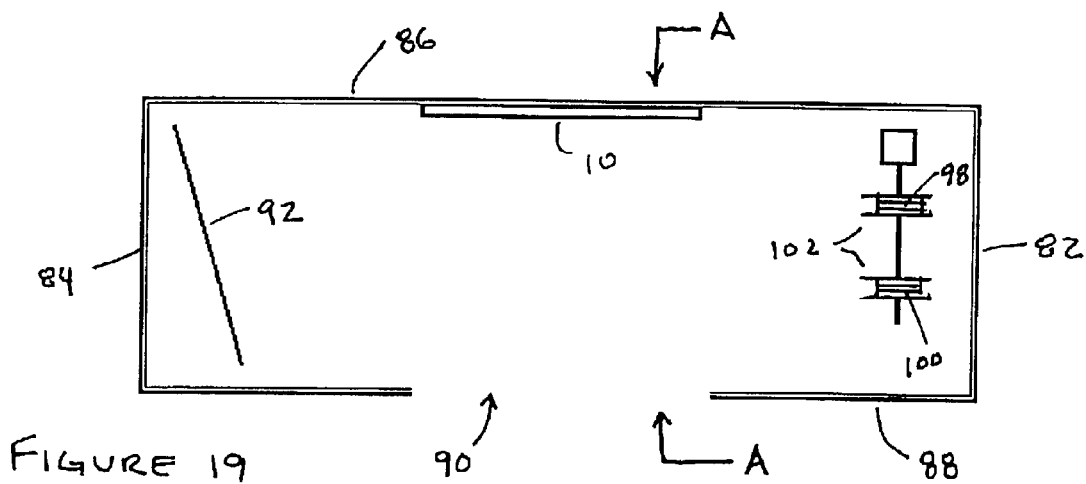
Figure 20:
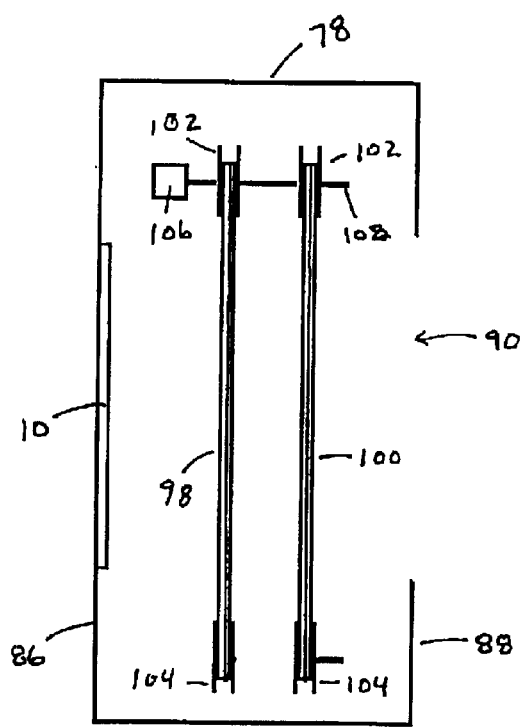

As shown in FIG. 17, the display includes an enclosure 76 having a top portion 78, a bottom portion 80, first and second side portions 82 and 84, a rear or back portion 86 and a front portion 88 with a viewing opening 90. A hologram 10 is attached to the inner rear wall 86 of the enclosure. As shown in FIG. 18, at one side of the enclosure a static mirror 92 is mounted in place by a bracket 94 or other suitable means. At the other side of the enclosure is a light assembly 96 that directs light to the mirror 92, from which it is reflected onto the hologram 10 to illuminate the hologram.

The light assembly 96 includes two side-by-side spaced-apart belts 98 and 100 that are each carried on an upper pulley 102 and a lower pulley 104, and that rotate in unison about the pulleys. The belts 98 and 100 are driven in unison by a stepping motor 106 that engages and turns both upper pulleys 102 via a drive shaft 108 that extends from the motor and through both upper pulleys.

As best seen in FIG. 18, first and second lamps 110 and 112 are carried at opposite ends of the twin belts 98 and 100, with each lamp 100 or 112 being attached to the twin belts by a mounting assembly described below, such that they ride in the space between the spaced-apart belts. As the belts 98 and 100 revolve on the pulleys in unison, they carrying the lamps 110 and 112 in a continuous circuit around the upper and lower pulleys 102 and 104. As the belts rotate in unison, one of the lamps 110 or 112 will always be on the side of the circuit facing the mirror 92, except when the lamps are transitioning simultaneously through the extreme top and bottom of the circuit defined by the revolution of the belts.

At any given moment, one of the lamps 110 or 112 (whichever happens to be on the side of the circuit adjacent the mirror) will be shining on the mirror. As that lamp moves vertically, the angle of that lamp is altered in a manner described below, so that the light from the center of the lamp will hit the mirror 92 in such a way as to be continuously reflected onto the center of the hologram 10, even as the lamp moves vertically.

Figure 21:
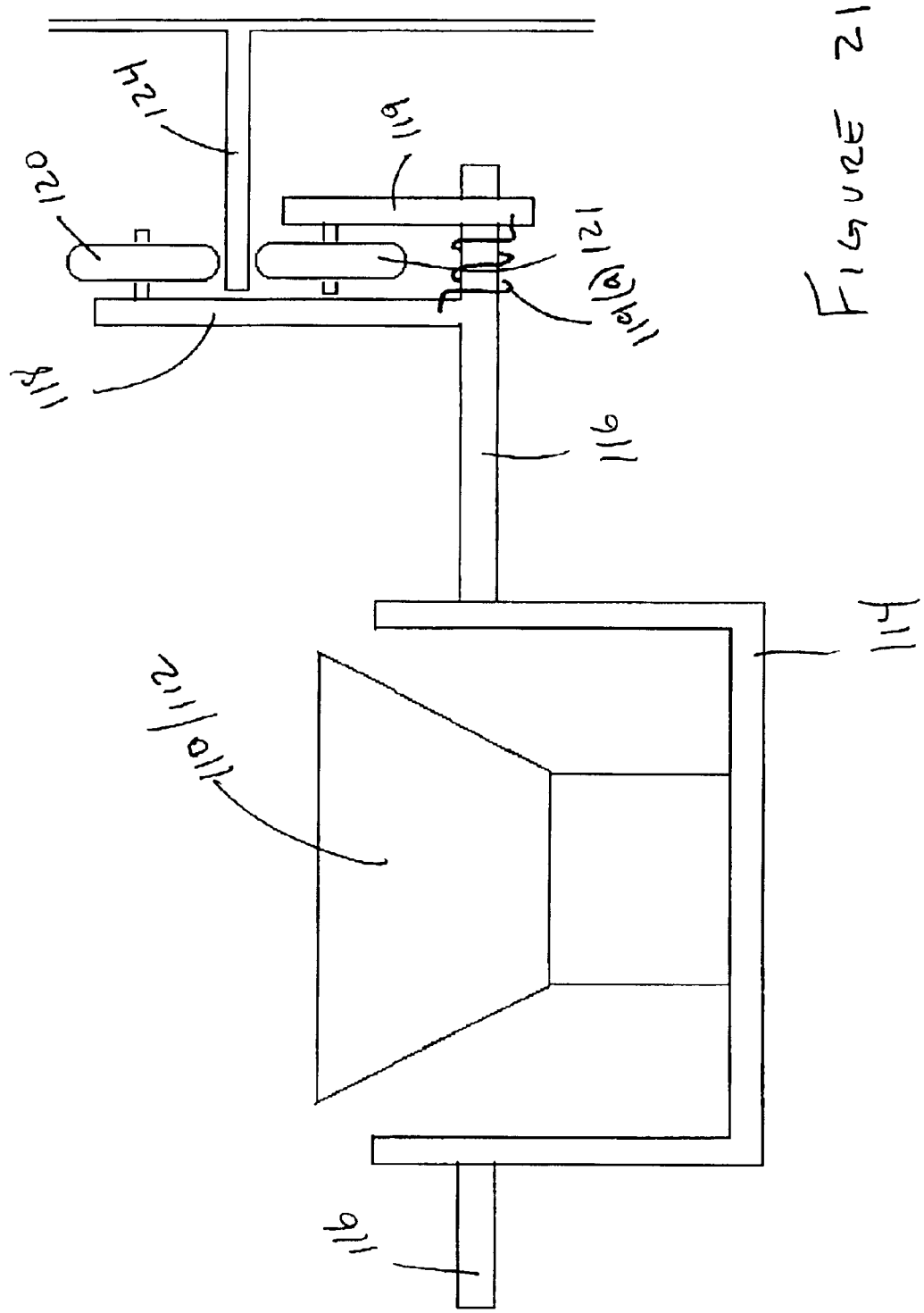
FIG. 21 shows the details of a lamp assembly for use in the embodiment shown in FIGS. 18, 19 and 20.
Figure 22:
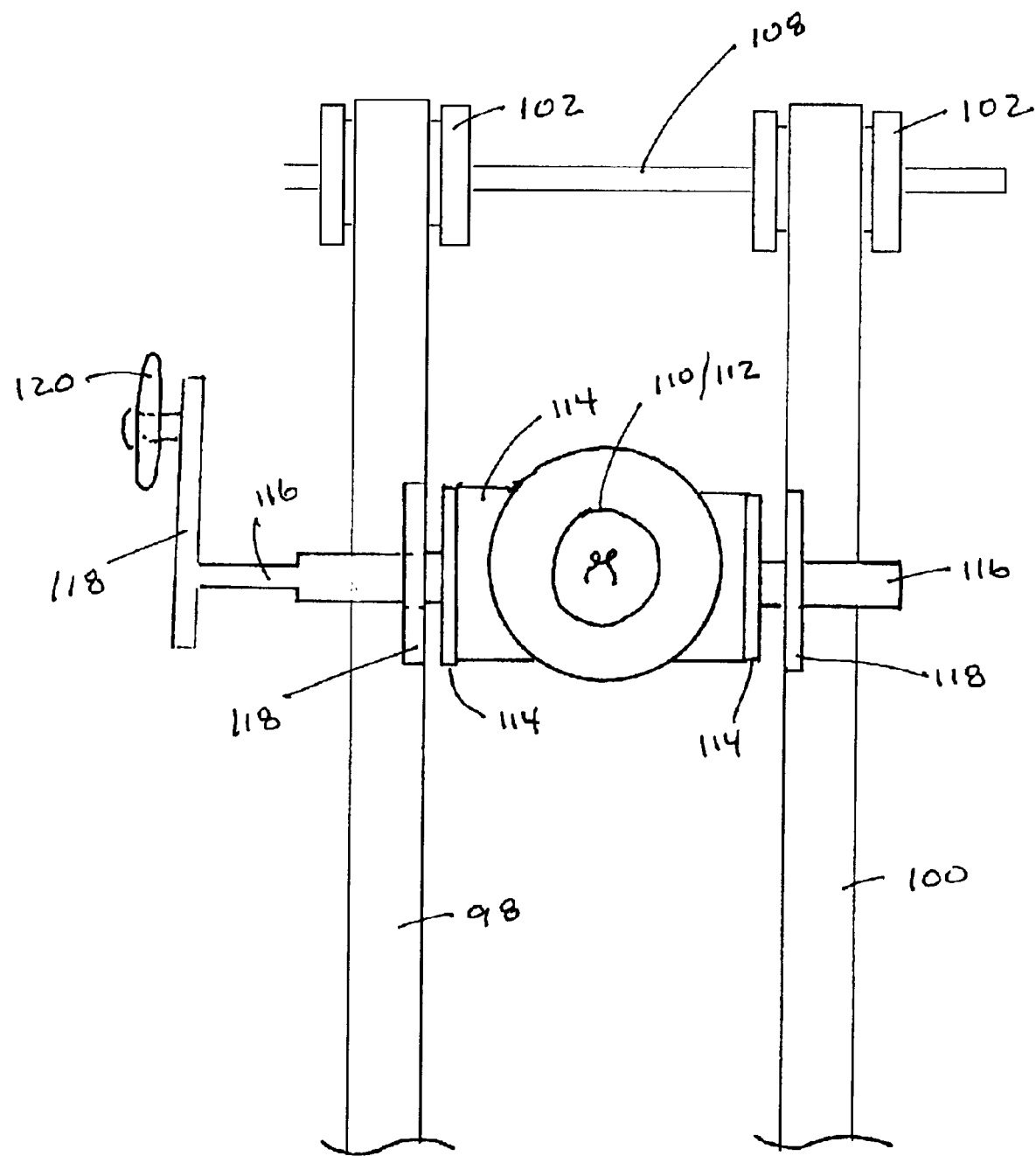
FIG. 22 is a frontal view of the light source apparatus of the embodiment shown in FIGS. 18, 19 and 20, illustrating various details of the mounting of the lamp assembly to the drive belts.

Turning next to FIG. 21, each lamp 110 or 112 is carried on a generally u-shaped mounting bracket 114. Axles 116 extend from opposite sides of each bracket 114. As shown in FIG. 22, each of the axles is pivotally held by a flange or member 118 that extends from the corresponding belt 98 or 100, thus attaching the bracket 114 to the belts and permitting the bracket 114 and its associated lamp 110 or 112 to pivot between the belts, much like a chair on a Ferris wheel. The axle 116 nearest the rear wall 86 of the enclosure 76 extends through the flange 118. A fixed arm 118 is connected to the end of the axle that extends through the flange. The distal end of the arm 118 includes a bushing or wheel 120, the purpose of which will become apparent. A second arm 119 is also connected to the same end of the axle 116 as the fixed arm 118, and includes a wheel or bushing 121 similar to that of arm 118. The second arm 119 is preferably pivotally connected to the arm 119, such that it can be biased toward the fixed arm 118, for example by a spring 119(a).

Figure 23:
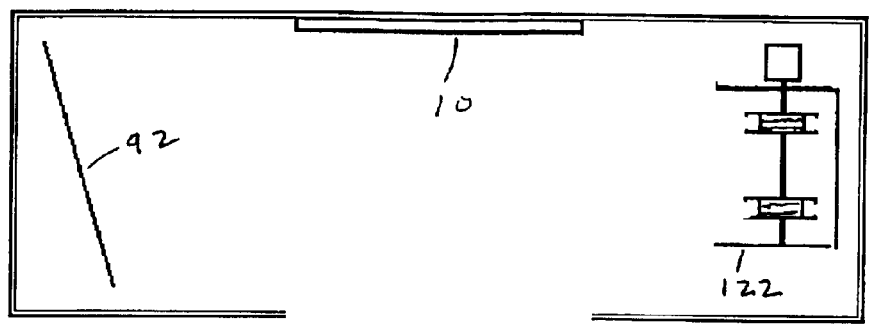
FIGS. 23 and 24 are similar to FIGS. 19 and 20, and show an internal housing for enclosing the light source assembly within the enclosure.
Figure 24:
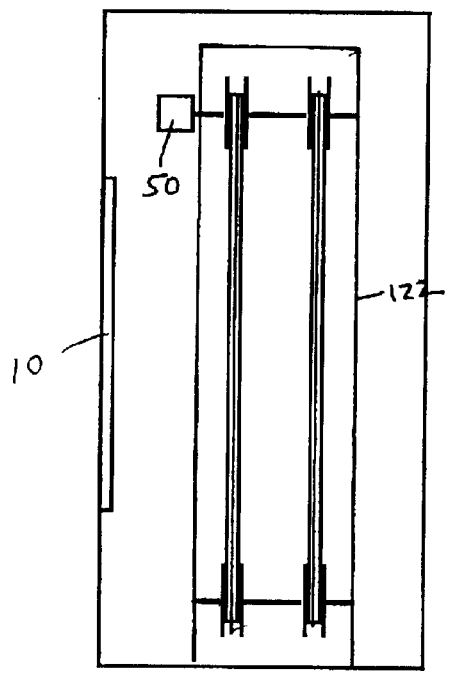

As shown in FIGS. 23 and 24, the entire lamp assembly (including the belts, pulleys, lamps and their associated components) is contained within a housing 122 inside the enclosure. The housing serves to block extraneous light from the lamp 110 or 112 that is on the backside of the circuit and thus not actively illuminating the hologram. The housing 122 fully encloses the lamp assembly, except on the front side of the housing, i.e., the side facing the mirror, which is open. The motor 106 is preferably mounted on the outer surface of the housing 122, with the shaft 108 extending through the wall of the housing and through the pulleys within the housing, and being supported by the opposed sidewalls of the housing. The axle for the lower pulleys is similarly supported by the sidewalls of the housing.

Figure 25:
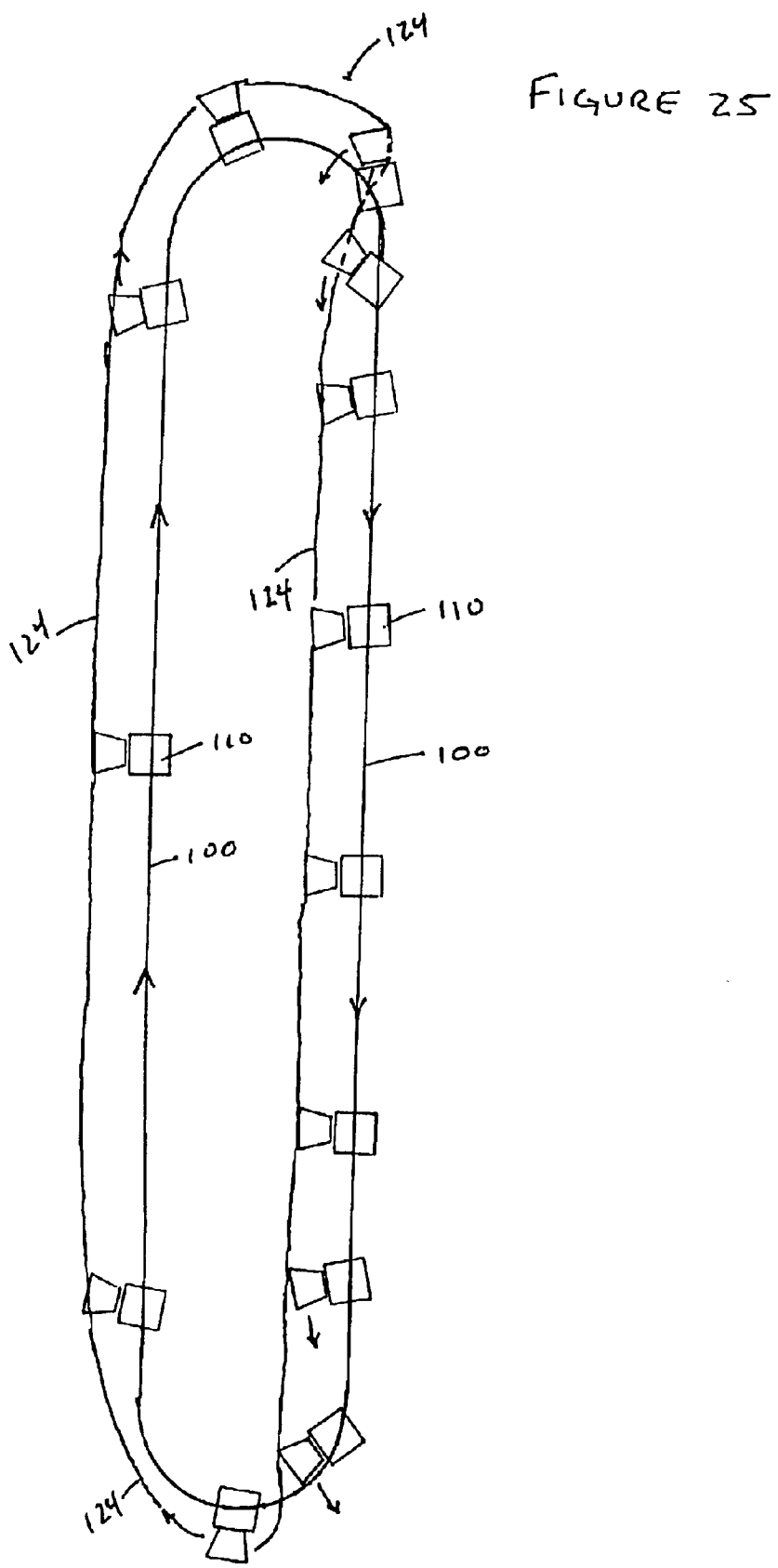
FIG. 25 illustrates the changes in orientation of a single lamp assembly as it revolves in a circuit on belts in the embodiment reflected in FIGS. 18–20 and 22, and the guide strip that controls the orientation of the lamps.

A raised strip or wall 124 extends inwardly from the sidewall of the enclosure, adjacent to the arms 118 and 119, as shown in FIG. 21. The strip is preferably a thin strip of steel with its edge spot welded to the inner surface of the enclosure. The purpose of this strip 124 is to control the orientation of each lamp as the lamp travels around the circuit, by guiding the wheels or bushings 120 and 121 at the ends of the arms 118 and 119 in a predetermined path. The strip is generally shaped to follow the locus of points traversed by the wheels 120 and 121 as the associated lamp assembly makes a complete loop of the circuit while oriented in the desired direction at each spot along the circuit, as shown in FIG. 25. The wheels 120 and 121 are on opposite sides of the wall, and grip the wall when arm 119 is biased toward the first arm 118. The strip 124 controls the position and orientation of the arms 118 and 119, which in turn controls the angular orientation of the brackets 114 each lamps 100 or 112.

Each lamp can use a standard MR16 or similar bulb that comes pre-mounted with a parabolic reflecting assembly to provide greater light intensity for a given wattage. Power is provided to each lamp by electrical wires (not shown) that extend into the housing 122 but remain situated on the outside of the plane of the outermost (from the hologram) pulleys. To prevent the wires from twisting as the lamps travel around the circuit, the movement of each lamp 110 and 112 is controlled by the strip 124 so that the lamp does not pivot through a complete circle as it travels around the circuit defined by the revolution of the belts, as shown in FIG. 25. Thus, as shown in FIG. 25, each lamp remains pointed in the general direction of the mirror, even when the lamp is on the backside of the circuit opposite the mirror, except that it can be deliberately tilted in some positions so as to minimize the enclosure size adjacent the light source assembly or to avoid the upper drive shaft or lower axle when it traverses the top or bottom of the circuit.

Figure 26:
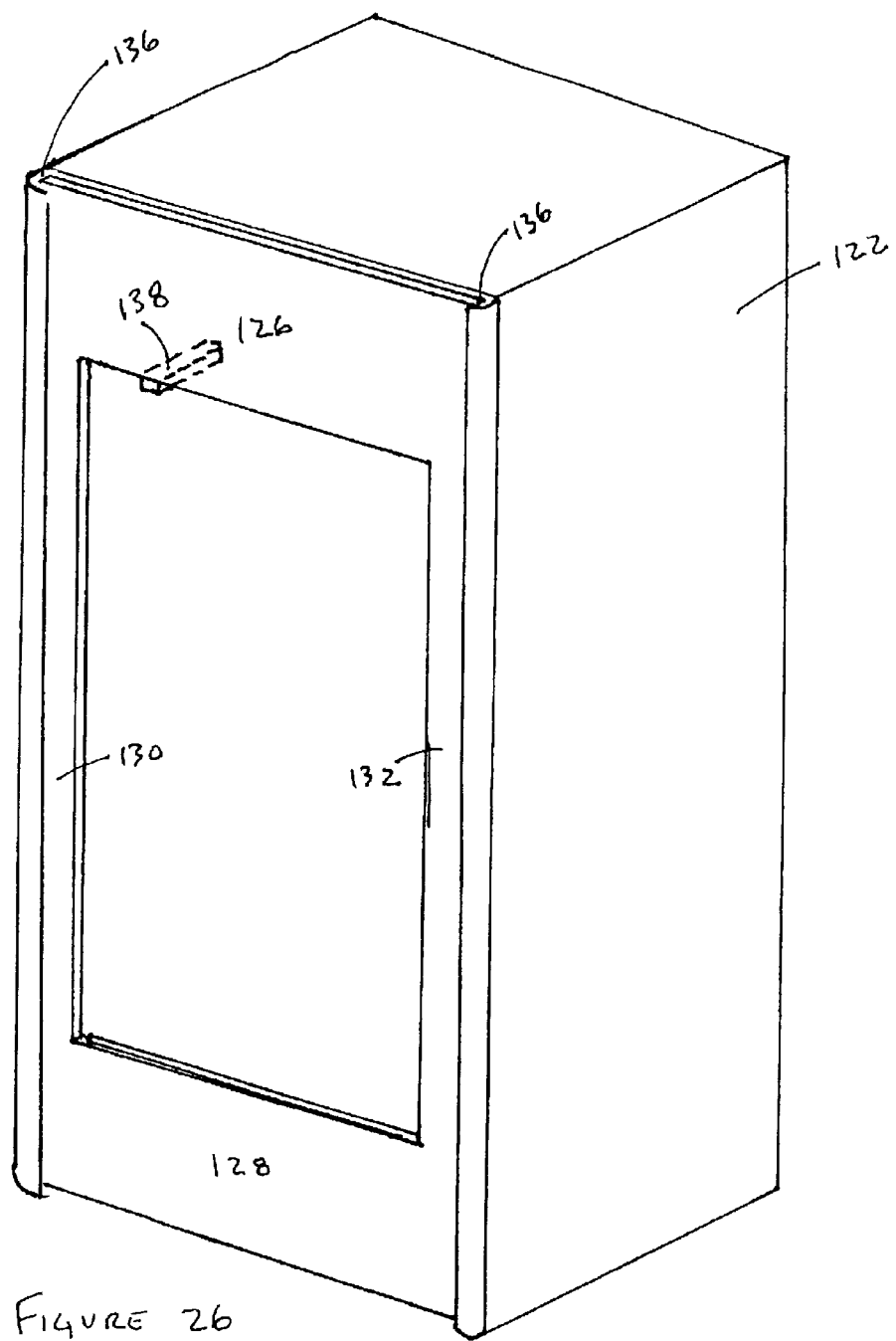
FIG. 26 is a perspective view of the internal housing shown in FIGS. 23 and 24, showing additional details of a shutter mechanism on the front of the housing.

Turning to FIG. 26, a shutter assembly is provided to shield the hologram from extraneous light from whichever lamp is net directed at the hologram at any given moment. The shutter assembly occupies the open front of the housing 122, and generally comprises an upper shield 126 at the top of the front opening and a lower shield 128 at the bottom of the opening. In a typical display, the shields will each be approximately 2 inches tall, and will extend across the entire width of the front of the housing. The shields are connected by vertical strips 130 and 132 that extend between the shields on opposite sides of the front opening, thereby forming an single integral shutter structure 134. The shutter structure 134 is slideably held in a groove or channel 136 formed on the sides of the front opening, which allow the shutter structure to slide up and down in the opening.

When the lamp assembly that is shining on the mirror 92 nears the top pulley, a pin or other structure 138 extending into the housing from the bottom edge of the upper shield is engaged by a portion of the lamp assembly, such as a portion or extension of the bracket 118 that is used to attach the lamp to the belt. At that instant, the light from the lower lamp (which is simultaneously approaching the lower pulley) is still shielded by the lower shield 128. As the upper lamp continues to move upward, it raises the entire shutter assembly 134 with it. As the upper lamp begins to move rearward and over the top of the upper pulleys 102, the pin 138 moves away from the shutter assembly 134, allowing the shutter assembly 134 to drop back into place. By that time, the lamp that has just started its upward journey is sufficiently high to clear the lower shield 128 once the shield assembly 134 has dropped back into place. This cycle is repeated continuously as the lamps move around the pulleys in a continuous circuit. To further protect the hologram from extraneous light, a shield can be positioned between the belts, from the upper pulleys to the lower pulleys, provided the shield must not interfere with the pivoting of the lamps between the belts.

It is not necessary to run the image rate at 24 frames per second, which is the nominal for motion pictures. In a motion picture, the reaction rate of the eye to a changing image is relied on to create the sensation of a smoothly changing image, rather than the actual case of a step wise progression of different image frames. In the case of a hologram, because the eye sees some of the two adjacent image frames in the hologram, there is a natural blurring effect that enhances the natural one created by the eye itself. Consequently it is not necessary to run through the hologram frames as fast as 24 frames per second, and frame rates as low as 12 frames per second would be satisfactory using the embodiments described herein. This has the result of halving the rate of motion of the lamp, and doubling the duration of the animation achievable.

However, it should be kept in mind if the active lamp (i.e., the lamp on the side of the circuit facing the mirror) travels at a uniform speed when illuminating the hologram, the rate of change of the angle of alteration will vary depending on the lamp's location. This will in turn effect the rate at which the animation is reconstructed. If it is desirable to have the animation displayed at a constant rate, the speed of the belts must be controlled accordingly.

While the lamps in the above-described embodiment have been described as moving vertically upward while illuminating the hologram, they could also move downward. The direction of revolution of the belts could also be reversed from time to time.

Another embodiment uses a transmission hologram mounted at the front of the enclosure with the mechanisms behind it. A red lamp mechanism and mirror, a green lamp mechanism and mirror, and a blue lamp mechanism and mirror are provided within the enclosure, with each mechanism separated by an angle, for example of 60 degrees. The separation is necessary in a transmission hologram to ensure that light from a particular color lamp is at a great enough angle to prevent reconstruction of the scenes encoded on the hologram by the other colors. A reflection hologram only reflects reconstructed light for the corresponding particular wavelengths of light, i.e, red with red, green with green, blue with blue, and not red with green, or red with blue and so on. The advantage of this arrangement is that the view at the front of the enclosure is that of the whole width of the hologram, and not a reduced size as is required with a reflection hologram by the necessity to have a direct line of view from the eyes to the hologram.

While the invention has been described by reference to various exemplary or preferred embodiments, the invention is not limited to those embodiments and persons of ordinary skill in the art will recognize that different embodiments or variations could also be used without departing from the scope and spirit of the invention as set forth in the following claims.

What is claimed is:

1. A system for displaying a hologram comprising:
    (a) a hologram;
    (b) a light source for illuminating the hologram; and
    (c) a mirror for reflecting light from the light source to the hologram;
    wherein, the angle between the light illuminating the hologram and a normal to the hologram where the light illuminates the hologram is varied over time, wherein for points on the surface of angle alteration for light that illuminates the hologram, a plane tangent to the surface of angle alteration at those points is not the same plane as the illumination plane at that same particular point by movement of one or both of the light source or mirror.

2. The hologram display system of claim 1 wherein the angle of illumination is varied by moving the mirror.

3. The hologram display system of claim 1 wherein the angle of illumination is varied by moving the light source.

4. The hologram display system of claim 3 wherein the light source moves relative to both the mirror and the hologram, and rotates as it moves to continue directing light onto the mirror for reflection onto the hologram.

5. The hologram display system of claim 4 wherein the light source moves vertically from a point at least as low as the lowermost point of the hologram to a point at least as high as the uppermost point of the hologram.

6. The hologram display system of claim 3 comprising a plurality of lights sources that move relative to the hologram and the mirror and wherein each of the plurality of lights illuminates the hologram in turn.

7. The hologram display system of claim 3 wherein the light source comprises, a plurality of light sources moved in a continuous circuit such that, at any given time, at lest some of the light sources are illuminating the hologram and some of the light sources are not illuminating the hologram.

8. The system of claim 1 wherein, for all points on the surface of angle alteration for light that illuminates the hologram, a plane tangent to the surface of angle alteration at any particular point is not always the same plane as the illumination plane at that same particular point.

9. The hologram display system of claim 1 wherein, for at least one particular point on the surface of angle alteration for any light source, a plane tangent to the surface of angle alteration at that point requires rotation by 20 degrees or more to become coplanar with the illumination plane for that light source at that same particular point.

10. The hologram display system of claim 1 comprising a first and second mirrors, wherein the light from the light source is directed at the first mirror and is reflected from the first mirror to the second mirror and from the second mirror to the hologram.

11. The hologram display system of claim 10 wherein the first mirror moves relative to the hologram and the direction of the light from the light source is adjusted to track the movement of the first mirror.

12. The hologram display system of claim 11 wherein the second mirror moves in coordination with the first mirror.

13. The hologram display system of claim 1 wherein the angle of illumination to the hologram is changed such that the angle from time to time increases in a given direction and then reverses.

14. The hologram display system of claim 13, wherein the increases or reversals in the angle of illumination occur on a random basis.

15. The hologram display system of claim 13, wherein the increases or reversals in the angle of illumination occur on a timed basis.

16. The hologram display system of claim 13, wherein the increases or reversals in the angle of illumination are keyed to specific frames.

17. The hologram display system of claim 1 wherein the surface of angle alteration for light that illuminates the hologram is a substantially vertical plane.

* * * * *

UNITED STATES PATENT AND TRADEMARK OFFICE
CERTIFICATE OF CORRECTION

PATENT NO. : 6,874,891 B1
DATED : April 5, 2005
INVENTOR(S) : Fleming

It is certified that error appears in the above-identified patent and that said Letters Patent is hereby corrected as shown below:

Column 16,
Line 2, delete "lights" insert -- light --.
Line 6, delete ",".
Line 7, delete "lest" insert -- least --.
Line 21, delete "a".

Signed and Sealed this

Eighth Day of November, 2005

JON W. DUDAS
*Director of the United States Patent and Trademark Office*